US009870181B2

United States Patent
Saito et al.

(10) Patent No.: US 9,870,181 B2
(45) Date of Patent: *Jan. 16, 2018

(54) METHOD OF CAUSING A PRINTER TO CARRY OUT A PRINTING OPERATION WITH DECOLORABLE MATERIAL

(71) Applicants: KABUSHIKI KAISHA TOSHIBA, Tokyo (JP); TOSHIBA TEC KABUSHIKI KAISHA, Tokyo (JP)

(72) Inventors: Koichiro Saito, Kanagawa (JP); Mikio Kakizaki, Tokyo (JP); Atsushi Nakamoto, Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,469

(22) Filed: Mar. 7, 2017

(65) Prior Publication Data
US 2017/0177282 A1    Jun. 22, 2017

Related U.S. Application Data

(63) Continuation of application No. 14/876,800, filed on Oct. 6, 2015, now Pat. No. 9,628,639.

(30) Foreign Application Priority Data

Oct. 9, 2014   (JP) ................. 2014-208242

(51) Int. Cl.
| H04N 1/04 | (2006.01) |
| G06F 3/12 | (2006.01) |
| H04N 1/00 | (2006.01) |

(52) U.S. Cl.
CPC .......... *G06F 3/1254* (2013.01); *G06F 3/1205* (2013.01); *G06F 3/1219* (2013.01); *G06F 3/1276* (2013.01); *G06F 3/1285* (2013.01); *H04N 1/00411* (2013.01); *H04N 2201/0094* (2013.01)

(58) Field of Classification Search
CPC ........... H04N 1/00204; H04N 1/00411; H04N 2201/0094
USPC ........................................ 358/1.15, 1.9, 474
See application file for complete search history.

(56) References Cited

U.S. PATENT DOCUMENTS

| 9,628,639 B2 * | 4/2017 | Saito ................. H04N 1/00204 |
| 2010/0046013 A1 | 2/2010 | Bonikowski et al. |
| 2010/0118338 A1 | 5/2010 | Sakiyama et al. |
| 2011/0012969 A1 | 1/2011 | Brewington et al. |

(Continued)

FOREIGN PATENT DOCUMENTS

JP    2012140005 A    7/2012

*Primary Examiner* — Houshang Safaipour
(74) *Attorney, Agent, or Firm* — Patterson & Sheridan, LLP

(57) ABSTRACT

A printer driver that is executable in a computer causes the computer to carry out a process including the steps of reading a first number of copies of a document to be printed with a decolorable material and a second number of copies of the document to be printed with a non-decolorable material, and generating a print command for a printer that causes the printer to print the first number of copies with the decolorable material and the second number of copies with the non-decolorable material.

20 Claims, 17 Drawing Sheets

(56) References Cited

U.S. PATENT DOCUMENTS

2011/0221851 A1\* 9/2011 Kawaguchi ................ B41J 2/32
                                                             347/179
2011/0310422 A1 12/2011 Hagiwara
2012/0170064 A1 7/2012 Hibino et al.

\* cited by examiner

FIG. 9

FIG. 16

METHOD OF CAUSING A PRINTER TO CARRY OUT A PRINTING OPERATION WITH DECOLORABLE MATERIAL

CROSS-REFERENCE TO RELATED APPLICATION

This application is a continuation of U.S. patent application Ser. No. 14/876,800, filed on Oct. 6, 2015, which is based upon and claims the benefit of priority from Japanese Patent Application No. 2014-208242, filed Oct. 9, 2014, the entire contents of each of which are incorporated herein by reference.

FIELD

Embodiments described herein relate generally to a printer driver that causes a computer to generate a print command that is executed by an image forming apparatus to print with decolorable material.

BACKGROUND

In the related art, an image forming apparatus can perform printing using a color material that may be decolorized (decolorable material) and a color material that cannot be decolorized (non-decolorable material).

Such an image forming apparatus typically receives a print job from a printing processing device such as a personal computer, for example, and forms an image based on the received print job. The print job is usually generated by a printer driver executed in the printing processing device.

DESCRIPTION OF THE DRAWINGS

FIG. 9 illustrates the operation screen when decolorable printing is set.

FIG. 16 illustrates an operation screen that is caused to be displayed by a printer driver according to a modification example of the fourth embodiment.

DETAILED DESCRIPTION

An embodiment provides a printer driver that generates a print job (printing data) to cause an image forming apparatus to perform a printing process using both decolorable material and non-decolorable material.

In general, according to an embodiment, a printer driver that is executable in a computer causes the computer to carry out a process including the steps of reading a first number of copies of a document to be printed with a decolorable material and a second number of copies of the document to be printed with a non-decolorable material, and generating a print command for a printer that causes the printer to print the first number of copies with the decolorable material and the second number of copies with the non-decolorable material.

First Embodiment

Figure 1:
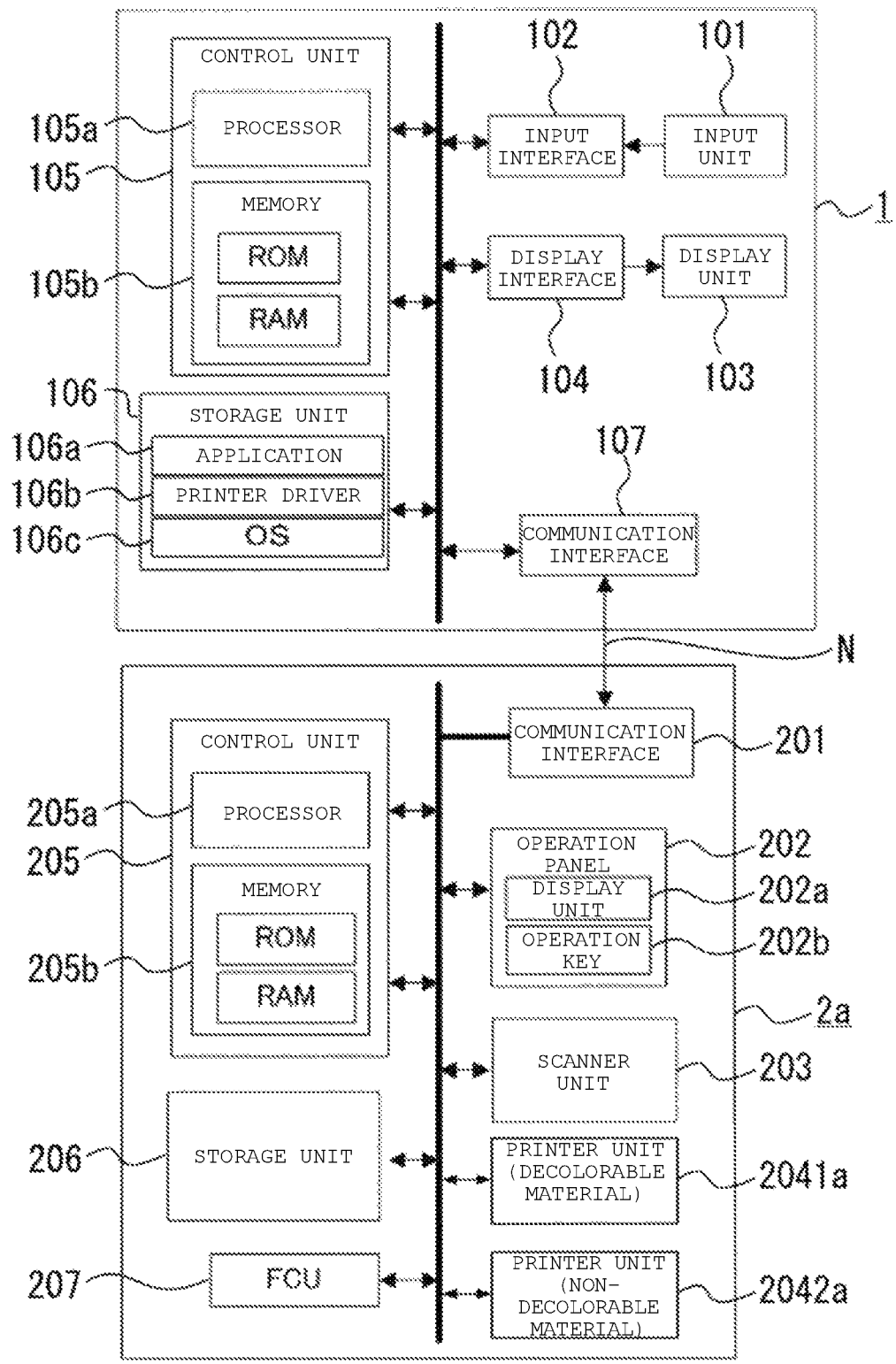
FIG. 1 is a block diagram of hardware components of a printing system according to a first embodiment.

A first embodiment will be described with reference to drawings. FIG. 1 is a block diagram of a printing system according to the first embodiment.

As illustrated in FIG. 1, the printing system according to the first embodiment includes, for example, an image processing device (printing processing device) 1, an image forming apparatus 2a (MFP: Multi-Function Peripheral), and the like. The image processing device 1 and the image forming apparatus 2a are connected to communicate with each other, using, for example, a wired or a wireless electric communication line N such as a Local Area Network (LAN) or Wireless Fidelity (Wi-Fi).

The image processing device 1 transmits a print job (printing data) to the image forming apparatus 2a through the electric communication line N. The image forming apparatus 2a executes a printing process of contents of the print job.

The image processing device 1 is a network terminal which includes a mobile terminal such as a personal computer (PC) or a smart phone. The image processing device 1 includes, for example, an input unit 101, an input interface 102, a display unit 103, a display interface 104, a control unit 105, a storage unit 106, a communication interface 107, and the like.

Here, the input unit 101 may be a keyboard, a mouse, a touch panel, a touch pad, a pen tablet, (graphics tablet), an exclusive button, and the like. The input unit 101 receives an input operation of a user, and converts the input operation into a signal corresponding to the input operation.

The input interface 102 delivers the signal to the control unit 105.

The display unit 103 includes, for example, electronic paper, a liquid crystal display (LCD), an electronic luminescence (EL), a plasma display panel (PDP), a cathode ray tube (CRT), and the like. Functions of the input unit 101 and the display unit 103 may be achieved using a so-called touch panel display.

The display interface 104 delivers a display control signal based on arithmetic processing in the control unit 105 to the display unit 103.

The control unit 105 performs calculating or the like, which is necessary for various processes such as arithmetic processing, display control processing, and print job generation processing in the image processing device 1. The control unit 105 includes a processor 105a, a memory 105b, and the like. The memory 105b includes a ROM and a RAM, for example.

The control unit 105 also takes a role of implementing various functions by executing a program which is downloaded to the memory 105b from the storage unit 106. In addition, the processor 105a may include, for example, a central processing unit (CPU), a micro processing unit (MPU), or the like. A portion or all of functions of the control unit 105 may be implemented using an Application Specific Integrated Circuit (ASIC) as necessary.

The storage unit 106 may include, for example, a hard disk drive (HDD), a flash memory, or the like. Specifically, the storage unit 106 stores, for example, an application program 106a, a printer driver 106b, an operating system 106c, and various setting values. The application program 106a includes a Web application, in addition to general software. The printer driver 106b operates as software of the operating system 106c, and generates a print job to be transmitted to the image forming apparatus 2a according to a printing instruction from the application program 106a.

A setting screen or the like of the printer driver 106b which is executed by the control unit 105 is displayed on the display unit 103 of the image processing device 1.

The communication interface 107 takes a role as an interface in the image processing device 1 for communication processing with the image forming apparatus 2a. The communication interface 107 communicates with the image forming apparatus 2a through a bidirectional interface 130 which uses an appropriate wireless or a wired method using IEEE 802.15, IEEE 802.11, IEEE 802.3, IEEE 1284 such as Bluetooth (registered trademark), an infrared connection, and an optical connection. The communication interface 107 may further include a USB connection unit to which a connection terminal of a USB standard is connected, a parallel interface, or the like. The control unit 105 communicates with the image processing device 1, a USB device, or other external devices, through the communication interface 107.

Subsequently, the image forming apparatus 2a will be described. The image forming apparatus 2a includes, for example, a communication interface 201, an operation panel 202, a scanner unit 203, a printer unit 2041a, a printer unit 2042a, a control unit 205, a storage unit 206, an FCU 207, and the like.

The communication interface 201 takes a role as an interface in the image forming apparatus 2a for communication processing with the image processing device 1. The communication interface 201 communicates with the image processing device 1 through the bidirectional interface 130 which uses an appropriate wireless or a wired method using IEEE 802.15, IEEE 802.11, IEEE 802.3, IEEE 1284 such as Bluetooth (registered trademark), an infrared connection, and an optical connection. The communication interface 201 may further include a USB connection unit to which a connection terminal of a USB standard is connected, a parallel interface, or the like. The control unit 205 communicates with the image processing device 1, a USB device, or other external devices through the communication interface 201.

The operation panel 202 receives an operation input of a user, and converts the operation input into a signal corresponding to the operation input. The operation panel 202 includes a touch panel-type display unit 202a and various operation keys 202b. The operation key 202b includes, for example, a ten key, a reset key, a stop key, a start key, and the like. In addition, the display unit 202a displays instruction items related to printing conditions such as a sheet size, the number of copies, setting of printing density, and finishing (binding, folding). Instructions of the displayed items are input from the display unit 202a.

The scanner unit 203 includes a built-in scanning reading unit which reads the original document as an image, an original document placing table, and an automatic original document feeding unit that transports the original document to a reading position. The scanning reading unit of the scanner unit 203 reads the original document which is set in the original document placing table or the automatic original document feeding unit.

The printer units 2041a and 2042a form an image corresponding to image data of the original document which has been read in the scanner unit 203, or an image corresponding to image data which has been sent from the image processing device 1 on a sheet. The printer unit 2041a is an image forming unit which may perform printing (decolorable printing) using a color material of which a color may be decolorized (decolorable material).

Here, as the color material of which a color may be decolorized (decolorable material), it is possible to use, for example, a color material of which a color may be erased by being heated, like a developer of a leuco dye, or heat-sensitive decolorable toner or ink using a decoloring mechanism. In addition, as the color material of which a color may be decolorized (decolorable material), it is also possible to use a color material of which a color may be erased using a chemical compound or by radiating light. In addition, here, the "decoloring" is not limited to a method of erasing a color using a chemical reaction, and also includes a method of removing an image itself which is formed on a sheet by physically removing off the image which is formed on the sheet using a color material.

In addition, here, the "decoloring" includes a case in which a color of a color material is set to a state of not being completely colorless (for example, translucent), for example, as well as a case in which an image is set to be colorless by erasing a color of a color material. That is, it may be a state in which a decolorable process is performed with respect to a color material as a target, and as a result, it is difficult to visually recognize an image which is formed using the color material. Furthermore, a process of making an image difficult to be visually recognized by setting a color of the image to be similar to a color of a sheet which is a printing target, for example, by making a color of an image printed on a color sheet to be similar to a color of the color sheet, or the like, is also included in the concept of "decoloring" here, without being limited to the case of making a color to be approximately transparent. In addition, a so-called "fading" which is caused by deterioration due to time such as exposing to ultraviolet light for a long term, or the like, is not included in the concept of decoloring here.

The printer unit 2042a is an image forming unit which may perform printing (non-decolorable printing) using a color material which cannot be decolorized (non-decolorable material).

Here, the color material which cannot be decolorized (non-decolorable material) is a color material of which decoloring of a color using heating, a medicine, radiating of light, or the like, is not possible, differently from the above-described decolorable material.

The control unit 205 performs calculating or the like, which is necessary for various processes such as arithmetic processing, display control processing, print job analysis processing, a printing process, a sheet transport process, and the like. The control unit 205 includes, for example, a processor 205a, a memory 205b, and the like. The processor 205a includes, for example, a central processing unit (CPU), a micro processing unit (MPU), or the like. The memory 205b includes, for example, a ROM and a RAM.

The control unit 205 also takes a role of implementing various functions by executing a program which is downloaded to the memory 205b from the storage unit 206. The control unit 205 controls the operation panel 202, the scanner unit 203, the printer units 2041a and 2042a, and a facsimile control unit (FCU) 207, based on a control program which is stored in the ROM or the storage unit 206. The control unit 205 further has a function of correcting image data or extending the data. A portion or all of functions of the control unit 205 may be implemented using an Application Specific Integrated Circuit (ASIC) as necessary.

The storage unit 206 includes, for example, a magnetic storage unit such as a Hard Disk Drive (HDD), an optical storage unit, and a semiconductor storage unit (flash memory, or the like). The storage unit 206 temporarily stores image data of a print job which is received from the image processing device 1 through the communication interface 201, and image data which is scanned in the scanner unit 203. In addition, the storage unit 206 stores various programs which are executed in the image forming apparatus 2a (including program which executes functions included in image forming apparatus such as copying function, printing function, scanning function, faxing function, and network file function, for example), various programs to be provided to an external device such as the image processing device 1, various setting values, or the like.

In a printing system which includes the image processing device 1 and the image forming apparatus 2a with such a configuration, the image processing device 1 generates a print job using an installed printer driver 106b based on an operation input of a user. The generated print job is transmitted to the image forming apparatus 2a and analyzed in the control unit 205 of the image forming apparatus 2a, and a printing process corresponding to the print job is executed in at least one of the printer units 2041a and 2042a. In addition, the printer driver 106b is not limited to a driver which directly transmits the print job to the image forming apparatus 2a. For example, the printer driver also transmits a print job to a print server (not illustrated) through a network. In this case, the print job is temporarily stored in the print server. An instruction for starting printing of the print job is sent to the print server through the operation panel 202 of the image forming apparatus 2a, or from the image processing device 1, and the print job which is stored in the print server is obtained by the image forming apparatus 2a, or the like.

The image forming apparatus 2a executes a printing process using one of the printer units 2041a and 2042a. In addition, the image forming apparatus 2a executes a printing process using both the printer units 2041a and 2042a on the same sheet.

Figure 2A:
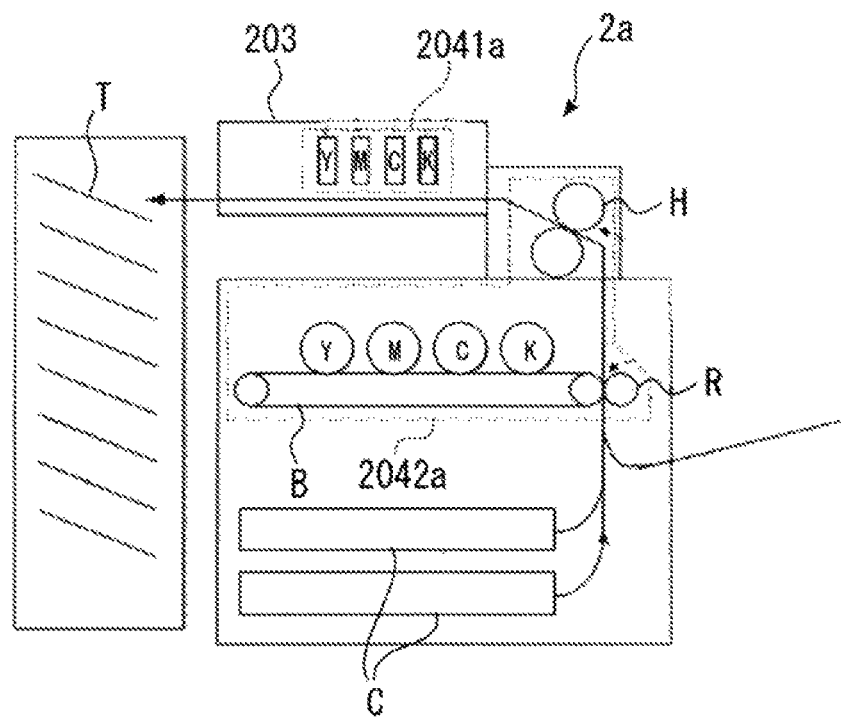
FIGS. 2A and 2B each schematically illustrate a configuration of an image forming apparatus of the printing system according to the first embodiment.

FIG. 2A is a cross-sectional view of the image forming apparatus 2a according to the first embodiment.

As illustrated in FIG. 2A, the image forming apparatus 2a according to the first embodiment includes the ink jet-type printer unit 2041a which uses ink as a decolorable material, and the electro-photographic printer unit 2042a which uses toner as a non-decolorable material.

Here, an example in an image forming operation in the image forming apparatus 2a according to the first embodiment will be described. For example, when image forming using the printer unit 2042a in which normal toner is used as a non-decolorable material is performed, first, a toner image which is formed on a photoreceptor (not illustrated) of the printer unit 2042a is transferred onto a surface of an intermediate transfer belt B (primary transfer) according to a copy job generated based on image data obtained by scanning the original document in the scanner unit 203, or a print job received from an external device. The toner image transferred to the intermediate transfer belt B is further transferred onto a sheet (secondary transfer) which is fed from a sheet feeding cassette C, a manual feed tray, or the like, according to an operation of a secondary transfer roller R. The toner image which is secondarily transferred onto the sheet is fixed in a fixing unit H by being heated thereafter, and is discharged onto a sheet discharging tray T by passing through the printer unit 2041a.

Meanwhile, when image forming using the ink jet-type printer unit 2041a in which decolorable ink of which a color is decolorable is used as a decolorable color material is performed, an ink image is formed on a sheet which is fed from the sheet feeding cassette C, the manual feed tray, or the like, according to a copy job generated based on image data which is obtained by scanning the original document in the scanner unit 203, or a print job which is received from the external device. The sheet on which the ink image using the decolorable material is formed is discharged onto the sheet discharging tray T.

The image forming apparatus 2a according to the first embodiment may also perform image forming using both the printer units 2041a and 2042a with respect to one sheet. In this case, for example, image forming using the printer unit 2041a is further performed with respect to a sheet on which a toner image formed in the printer unit 2042a is fixed, and the sheet is discharged onto the sheet discharging tray T thereafter.

In addition, the printer units 2041a and 2042a are not limited to the above-described configuration, and the printer unit 2041a may be an electro-photographic type, and the printer unit 2042a may be an ink jet type. Alternatively, both the printer units 2041a and 2042a may be the ink jet type.

Figure 2B:
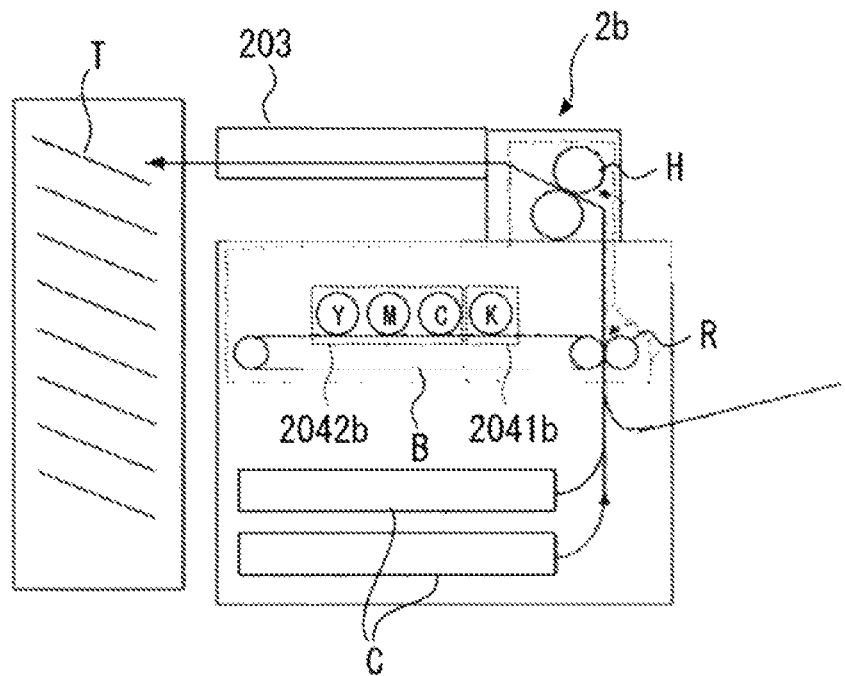

FIG. 2B is a cross-sectional view of an image forming apparatus 2b according to another example of the first embodiment.

In FIG. 2A, the printer units 2041a and 2042a are arranged at different positions with the fixing unit H therebetween in the sheet transport direction; however, there is no limitation to this configuration. When a so-called multiple tandem system is used, as illustrated in FIG. 2B, both the printer units 2041a and 2042a may form toner images on the intermediate transfer belt B. As a matter of course, the number of printing units which are arranged along the surface of the intermediate transfer belt B is not limited to four, and may be five or more.

In FIG. 2B, the printer unit 2041a which uses decolorable toner as a decolorable material may perform image forming using K (black), and the printer unit 2042a which uses normal toner as the non-decolorable material may perform image forming using a plurality of colors of Y (yellow), M (magenta), C (cyan); however, there is no limitation to this configuration. The number of the colors may be smaller than that in FIGS. 2A and 2B, and five colors or more is possible. In addition, instead of the multiple tandem system illustrated in FIGS. 2A and 2B, a so-called revolver method may be employed.

Figure 3:
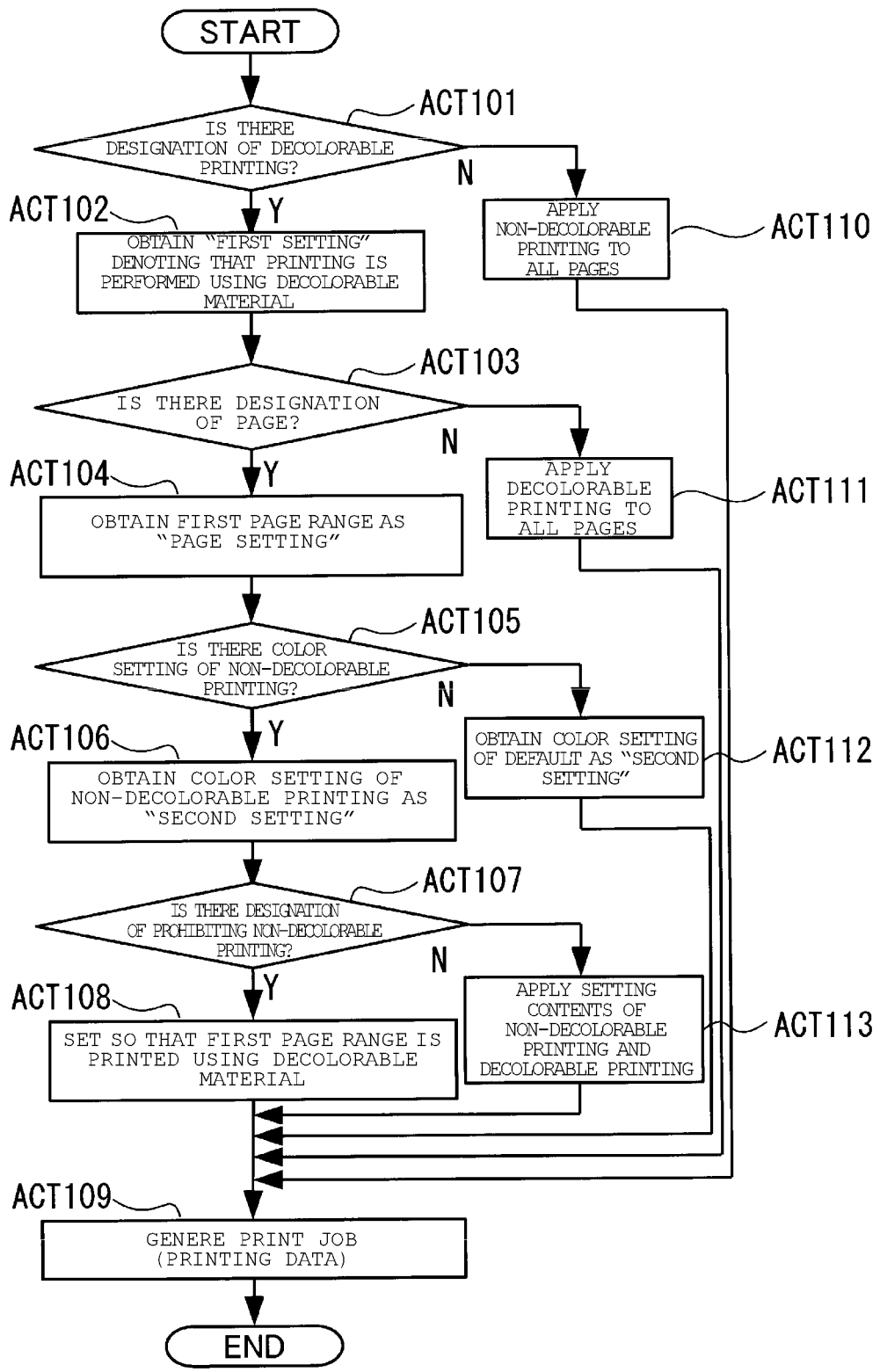
FIG. 3 is a flowchart of a print setting operation with respect to pages of a document.

Subsequently, an arbitrary print setting method with respect to an arbitrary page range of a document will be described with reference to FIGS. 3 to 6. FIG. 3 is a flowchart which illustrates an arbitrary print setting method with respect to an arbitrary page range of a document.

Figure 4:
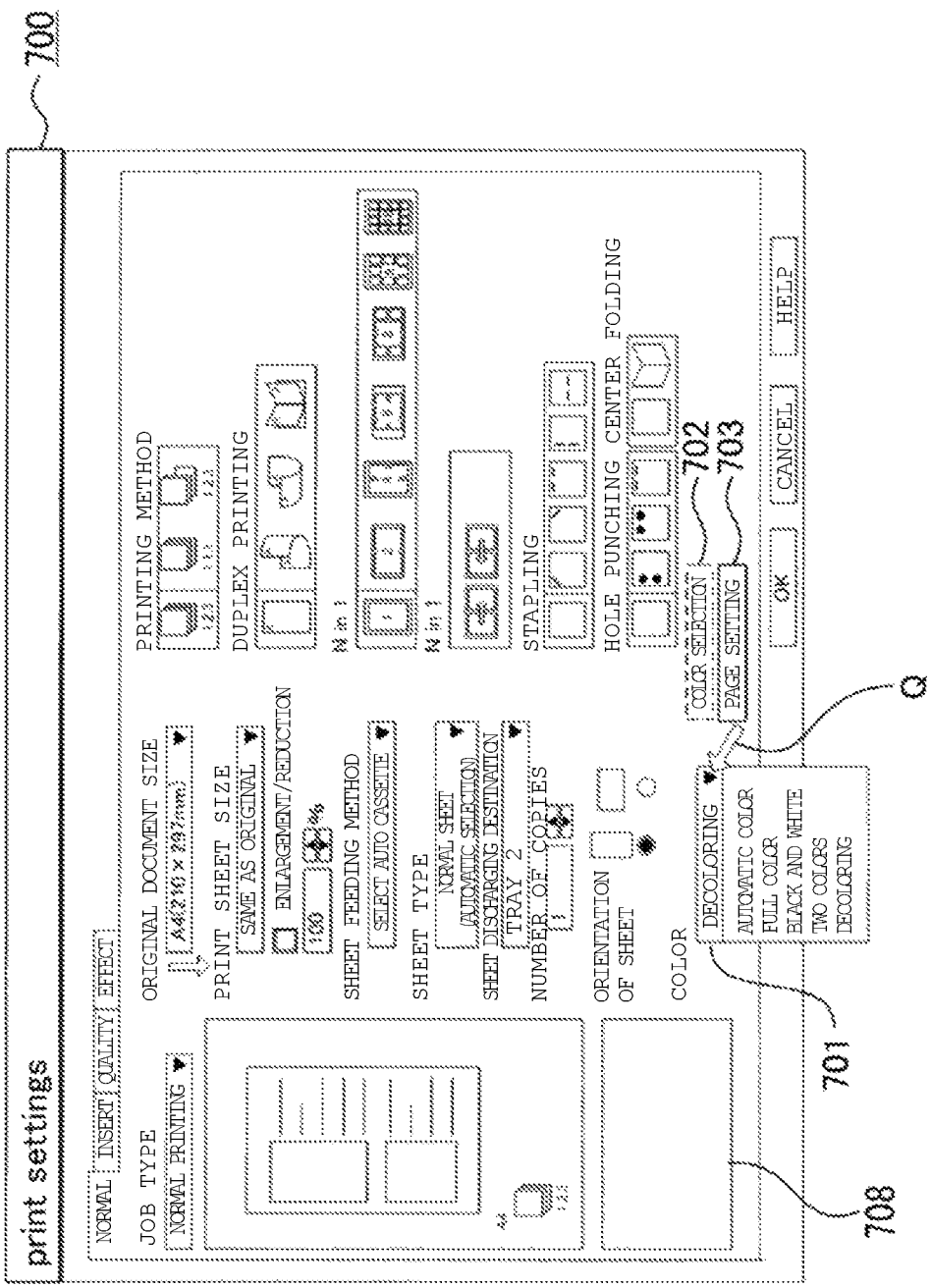
FIG. 4 illustrates an example of an operation screen on a display unit, which is caused to be displayed by a printer driver executed in an image processing device of the printing system.
Figure 5:
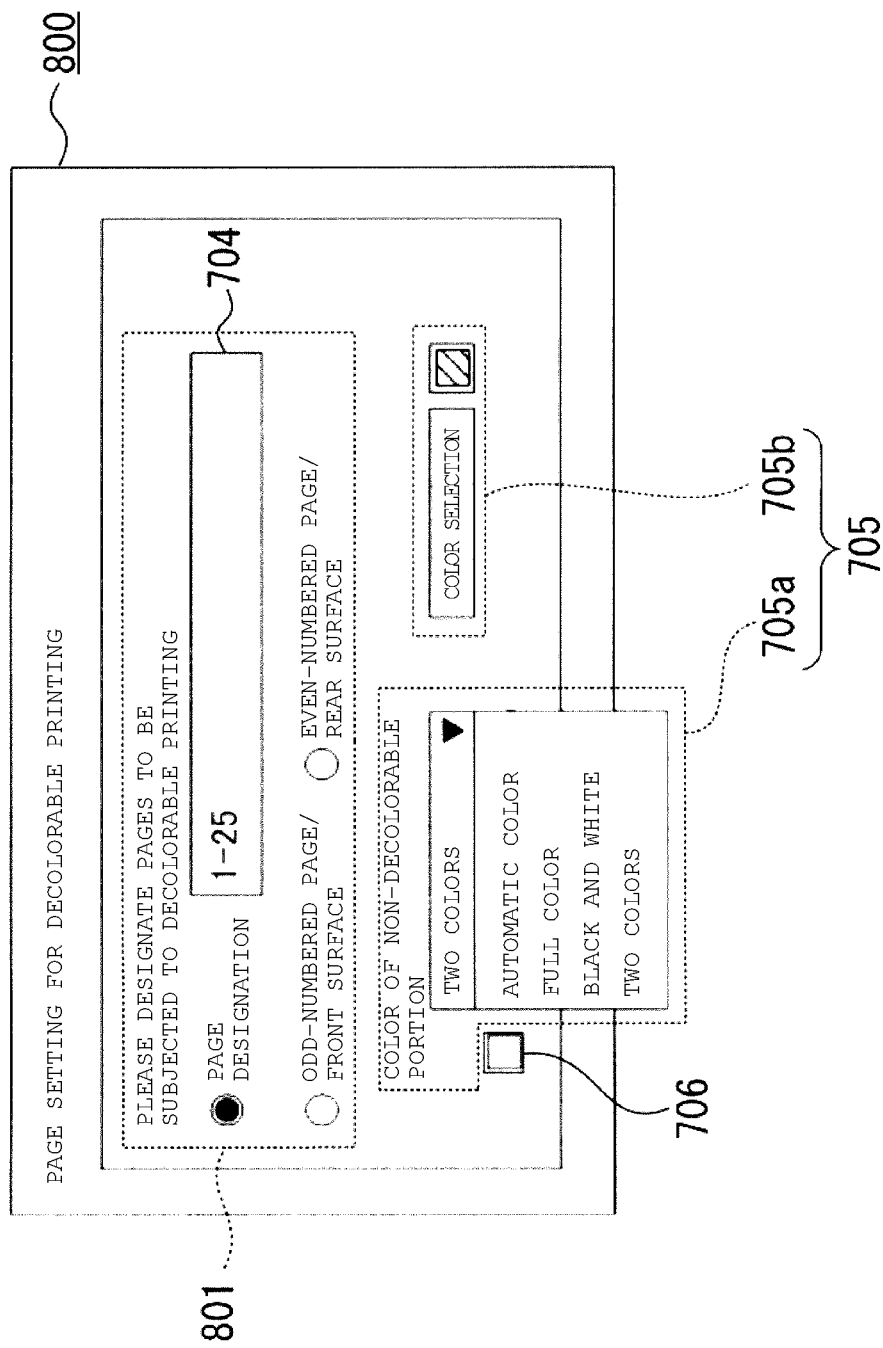
FIG. 5 illustrates an example of a setting screen for setting pages of the document subject to decolorable printing.
Figure 6:
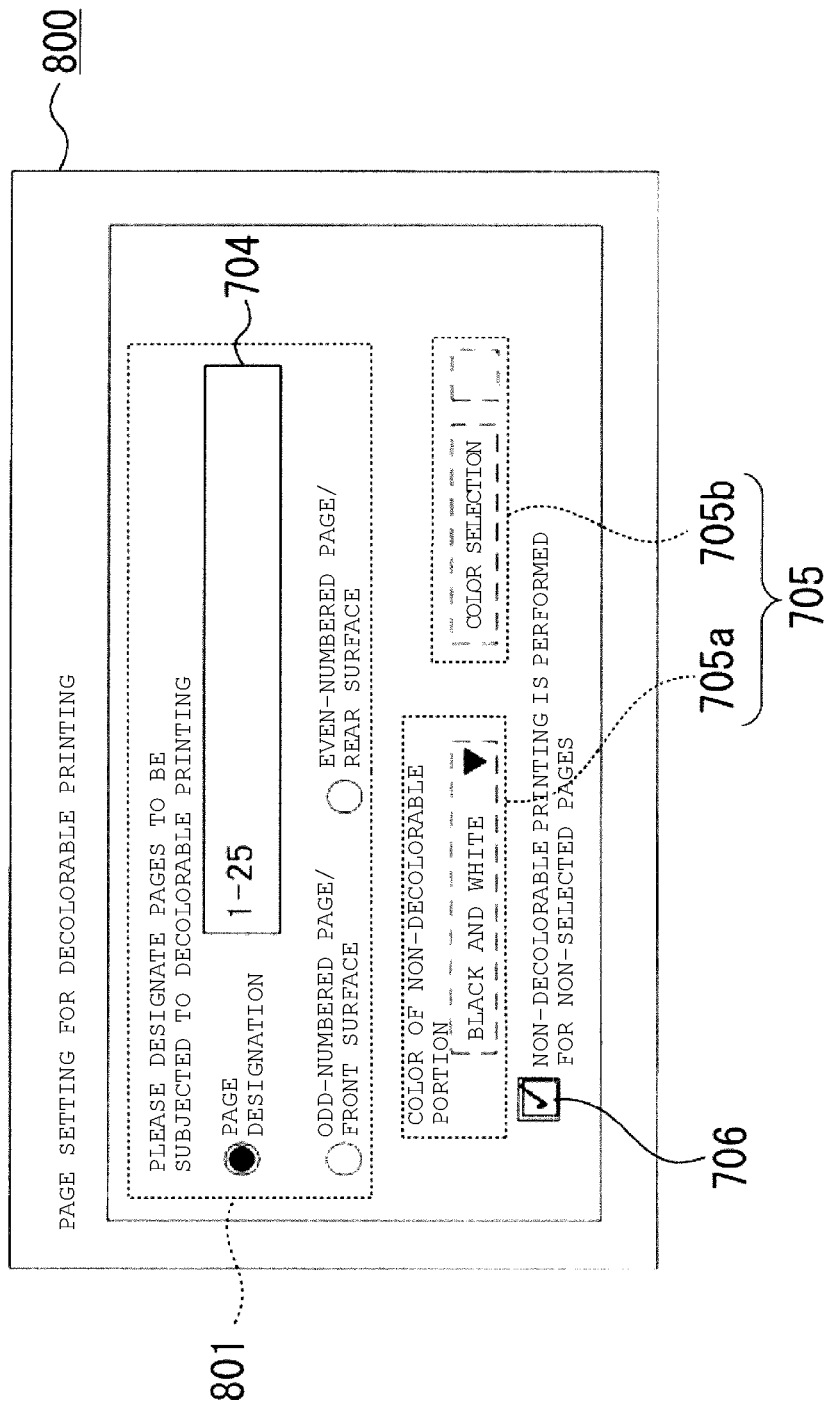
FIG. 6 illustrates the setting screen when "no non-decolorable printing" is set in a check box.

FIG. 4 illustrates an example of an operation screen of a printer driver 106b which is executed by the control unit 105 of the image processing device 1. FIGS. 5 and 6 illustrate examples of setting screens for setting of pages for decolorable printing, which is displayed on the display unit 103 when a page setting button 703 in FIG. 4 is pressed.

In ACT 101 in FIG. 3, the control unit 105 determines whether or not designation of decolorable printing is received. For example, the control unit 105 obtains setting of a color of a generated print job through an operation screen 700 of the printer driver 106b which is illustrated in FIG. 4, and determines whether or not the obtained color is a method in which decolorable printing is instructed. Here, the operation screen 700 of the printer driver 106b is displayed on the display unit 103 of the image processing device 1, for example.

The operation screen 700 of the printer driver 106b according to the present embodiment includes a color setting portion 701 to select a color when performing printing. In the color setting portion 701, a pull-down menu, for example (refer to arrow Q illustrated in FIG. 4), is used to select a color. For example, according to the present embodiment, it is possible to arbitrarily select any one of "automatic color", "full color", "black and white", "two colors", and "decolorable".

The printer driver 106b generates a print job based on various setting selected in the operation screen 700 and image data of a printing target. As various setting selected in the operation screen 700 of the printer driver 106b, for example, there are (1) the number of copies to be printed, (2) a size of the original document, (3) a size of a printing sheet to be output, (4) an enlargement-reduction rate when printing the original document on a sheet, (5) a sheet feeding method, (6) a type of a sheet or the like, (7) a printing method (sort), (8) duplex printing, (9) N in 1 printing, (10) stapling, (11) punching, and the like. The printer driver 106b transmits a generated print job to the image forming apparatus 2a, for example. The image forming apparatus 2a forms an image based on various setting such as setting of the above described color which is included in the obtained print job.

When the print job includes setting of the "automatic color", the image forming apparatus 2a automatically determines whether or not a document as a printing target includes a color other than black based on contents of the obtained print job, performs printing using full color when the original document includes a color other than black, and performs monochrome (black and white) printing when the original document does not include a color other than black. When the print job includes setting of the "full color", the image forming apparatus 2a usually performs printing using a plurality of color materials (for example, Y, M, C, K) regardless of a type of a color included in the original document. When the print job includes setting of "black and white", the image forming apparatus 2a usually performs printing using only a color material of black (K), regardless of a type of a color included in the original document. When the print job includes setting of the "two colors", the image forming apparatus 2a performs printing of the original document using two colors (printing colors) which are selected on the operation screen of the printer driver. When the print job includes setting of the "decoloring", the image forming apparatus 2a performs printing using a decolorable material.

As a matter of course, the printing may be performed using a plurality of colors of decolorable materials, or a single color of non-decolorable materials according to a configuration of a cartridge (or color material) used in the image forming apparatus. In addition, a color described above is an example, and there is no limitation to this configuration. For example, when a cartridge with a decolorable material may use two colors of black and blue in the image forming apparatus, the color may be set as "decoloring (K)", or "decoloring (blue)", in the color setting portion 701.

When "decoloring" is selected in the color setting portion 701 (Yes in ACT 101), the control unit 105 (first setting obtaining unit) obtains "first setting" as setting information, which denotes that printing is performed using a decolorable material (ACT 102). FIG. 4 illustrates a state in which "decoloring" is selected in the color setting portion 701, as an example.

Meanwhile, when "decoloring" is not selected in the color setting portion 701 (No in ACT 101), the control unit 105 sets non-decolorable printing with respect to all pages of a document which is a printing target (ACT 110).

In addition, in FIG. 4, a color selection button 702 is in a gray-out state (denoted by dashed line). The color selection button 702 may be selected when "two colors" is selected in the color setting portion 701.

When "two colors" is selected in the color setting portion 701, and the color selection button 702 is selected, a selection screen of a color to be used is displayed, and it is possible to select a desired color (printing color) among a plurality of colors. In addition, in the two-color printing, one color may be set as black and a color which is used at a portion other than black may be selected, or two colors may be arbitrarily selected.

A page setting button 703 illustrated in FIG. 4 is a button icon which is selected when performing setting of pages for decolorable printing, and is a button which causes printing to be executed in a state in which pages for decolorable printing and pages for non-decolorable printing are mixed in one job for printing the original document.

In addition, the control unit 105 determines whether or not "page setting" is selected (ACT 103). For example, the control unit 105 determines that "page setting" is not selected when "decoloring" is selected in the color setting portion 701 in FIG. 4 (Yes in ACT 101), and the page setting button 703 is not selected. In this case, the control unit 105 sets decolorable printing with respect to all pages of a document which are generated as a print job (ACT 111).

Meanwhile, when the page setting button 703 is pressed, for example, a setting screen 800 which performs setting of pages for decolorable printing in FIG. 5 or 6 is displayed on the display unit 103. In FIGS. 5 and 6, in order to simplify descriptions, a color to be expressed using a selectable decolorable material is one. Here, the case in which a color to be expressed using a selectable decolorable material according to the embodiment is one includes a case in which a cartridge of a color material of toner or ink jet-type of the printer unit 2041a of the image forming apparatus 2b which may be used in a printing system is one (or one color), a case in which, even when the printer unit 2041*a* includes a plurality of cartridges, a selectable color is one due to toner empty, or the like.

As illustrated in FIG. 5, the setting screen 800 (setting screen for pages for decolorable printing) includes a page setting portion 801 to set a page range (first page range) to be printed based on print setting (first setting) which is selected by a user among a plurality of pages of a document as a printing target. The setting screen 800 includes, for example, setting items of a "page designation", "odd-numbered pages/front surface", and "even-numbered pages/rear surface" as the page setting portion 801, and each setting item may be alternatively selected, respectively. As illustrated in FIG. 5, when the "page designation" in which a target page is specified by a page number is selected, setting of a page number of a page to be subjected to decolorable printing may be input into a text box 704 corresponding to the "page designation". When a page as a target of the "page designation" is designated using a range, it is possible to input the page number using "1-25", for example, and when a page number of a target page is individually designated, it is possible to input the page number using "1, 5, 9", for example.

When a page range (first page range) to be printed based on print setting (first setting) which is selected by a user is designated among a plurality of pages which configure a document as a printing target (Yes in ACT 103) in the page setting screen 800, the control unit 105 (page setting obtaining unit) obtains the page range as "page setting" (ACT 104).

The control unit 105 (second setting obtaining unit) determines whether or not a color when performing printing using a non-decolorable material or a printing color is set (ACT 105). Here, when the color for the non-decolorable printing or the printing color is set (Yes in ACT 105), the control unit 105 (second setting obtaining unit) obtains print setting of a color in which printing is performed using a non-decolorable material, or a printing color as "second setting" as print setting to be applied, with respect to a page range (second page range) other than the page range (first page range) which is selected as a range to be printed using a decolorable material, among a plurality of pages of the document as the printing target (ACT 106).

Meanwhile, when setting of a color or a printing color with respect to non-decolorable printing is not performed (No in ACT 105), the control unit 105 obtains setting of a color or a printing color in the non-decolorable printing which is default as "second setting" with respect to the second page range which is different from the first page range (ACT 112).

The control unit 105 (generation unit) generates a print job (printing data) in which "the first page range" which is denoted by the obtained "page setting" is caused to be printed in the image forming apparatus 2*a* using a decolorable material based on the "the first setting", and "the second page range" is caused to be printed in the image forming apparatus 2*a* using a non-decolorable material based on the "the second setting", among a plurality of pages of the document as the print target (ACT 109).

Furthermore, when "odd-numbered page/front surface" is selected in the page setting portion 801 which is illustrated in FIG. 5, the control unit 105 generates a print job in which the odd-numbered pages are caused to be printed using a decolorable material, and pages which are not designated are caused to be printed using a non-decolorable material in the image forming apparatus 2*a*. In addition, when "even-numbered page/rear surface" is selected in the page setting portion 801 which is illustrated in FIG. 5, the control unit 105 generates a print job in which the even-numbered pages are caused to be printed using a decolorable material, and pages which are not designated are caused to be printed using a non-decolorable material in the image forming apparatus 2*a*.

In the page setting screen 800 in FIG. 5, a non-decolorable color setting portion 705 designating a color which is used in printing when performing non-decolorable printing is further included. The non-decolorable color setting portion 705 includes a color setting portion 705*a* and a color selection button 705*b*. In the present embodiment, any one of "automatic color", "full color", "black and white", and "two colors" may be arbitrarily selected in the color setting portion 705*a*. Since descriptions of these colors are the same as those of the color of the color setting portion 701, descriptions thereof will be omitted. Here, when a color is set, a page which is not set in the page setting portion 801 (second page range) is subjected to non-decolorable printing using a set color. The color selection button 705*b* which is illustrated in FIG. 5 is operate to select a color (printing color) when "two colors" is selected in the color setting portion 705*a* using a color palette (not illustrated), or the like. When a color is selected, the selected color is displayed adjacent to the color selection button 705*b*. In addition, when a color other than the "two colors" is selected in the color setting portion 705*a*, the color selection button 705*b* becomes a gray-out state and not selectable.

In the above described example, pages which are input to the text box 704 (refer to FIG. 5) for page designation are set as a target of decolorable printing, and pages which are not designated are automatically set to a target of non-decolorable printing; however, there is no limitation to this configuration. For example, pages which are input to the text box 704 (refer to FIG. 5) for page designation may be set as a target of "non-decolorable printing", and pages which are not designated may be automatically set as a target of "decolorable printing". That is, the control unit 105 may obtain "the first setting" as setting information which denotes that printing is performed using a non-decolorable material, a page range (first page range) to be printed based on "the first setting" as "page setting", and print setting of decolorable printing as "the second setting" with respect to the second page range which is different from the first page range.

In addition, for pages which are not desired to be printed, it is possible to set so that pages which are not designated are not printed, by designating pages to be printed from a printing program which is included in each of various applications such as document creating software, spreadsheet software, or the like, which is different from the printer driver. Furthermore, both pages for decolorable printing and pages for non-decolorable printing may be designated, and pages which are not designated may not be printed.

FIG. 6 illustrates an example in which "non-decolorable printing is not performed" is further set in a checkbox 706, in a setting screen for pages for decolorable printing. As illustrated in FIG. 6, when pages for decolorable printing (here, it is set as 1 page to 25 pages) are designated and "non-decolorable printing is not performed" is selected (Yes in ACT 107), the printer driver 106*b* performs decolorable printing with respect to only pages which are designated in the page setting portion 801 (ACT 108), and pages which are not designated are subjected to print setting of executing neither decolorable printing nor non-decolorable printing. When "non-decolorable printing is not performed" is selected, the color setting portion 705a and the color selection button 705b for non-decolorable printing become a gray-out state, in which color selection of non-decolorable printing cannot be selected. Meanwhile, when "non-decolorable printing is not performed" is not selected (No in ACT 107), the control unit 105 sets setting contents with respect to non-decolorable printing and decolorable printing which are set to setting contents which will be reflected in the print job (ACT 113).

Modification Example

Figure 7:
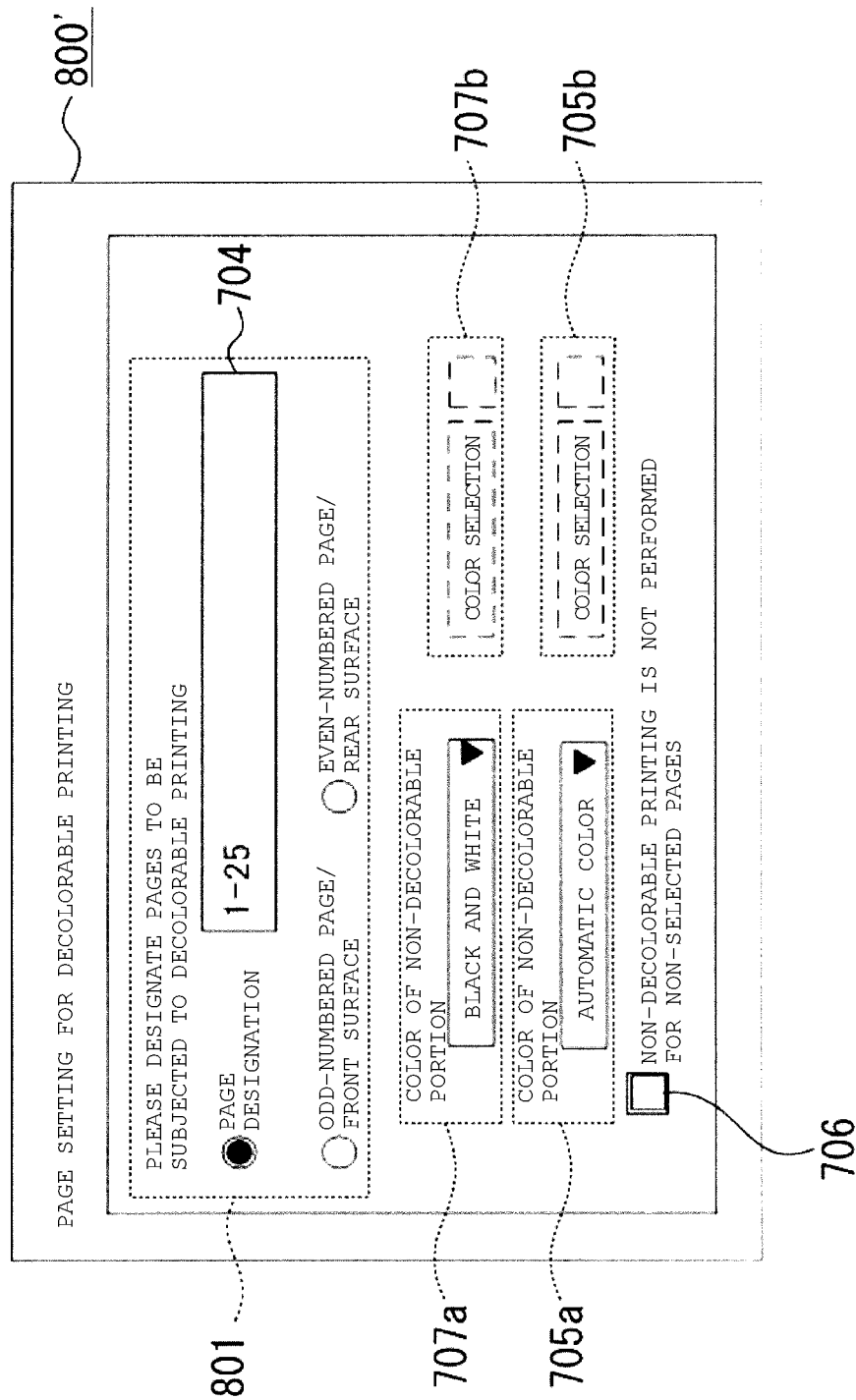
FIG. 7 illustrates another example of the setting screen.

Subsequently, a form of executing the printer driver 106b which includes a selection function of a color (or printing color) of decolorable printing will be described. FIG. 7 illustrates an example of a setting screen for pages for decolorable printing of the printer driver 106b which has a selection function of a color of decolorable printing. The printer driver 106b in the modification example generates a print job by setting a color of decolorable printing when printing is performed in an image forming apparatus which includes a plurality of cartridges having decolorable materials of colors which are different from each other, as exemplified in FIGS. 2A and 2B. Here, the image forming apparatus which includes the plurality of cartridges having decolorable materials of colors different from each other, may be two decolorable cartridges of black (K) and blue (B), three decolorable cartridges of YMC, four decolorable cartridges of YMCK, or two decolorable cartridges of CK, or the like in addition to the non-decolorable cartridge. A combination of a non-decolorable cartridge and a decolorable cartridge is not limited to the example, and various combinations are possible. In addition, the exemplified decolorable cartridge with YMCK or a decolorable cartridge with a color other than B may be mounted.

Figure 8:
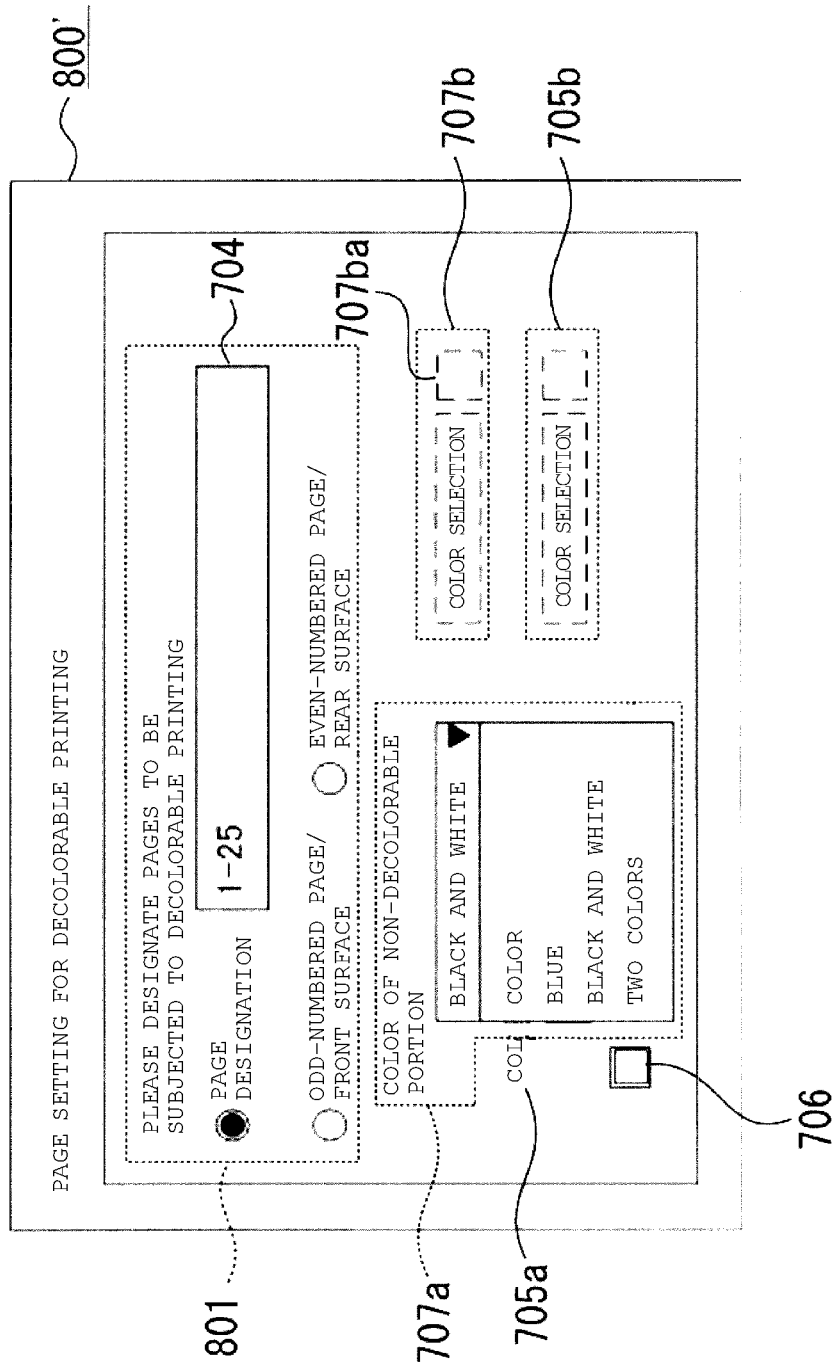
FIG. 8 illustrates the setting screen of FIG. 7 when an item is selected from a pull-down menu.

In a page setting screen 800' illustrated in FIG. 7, as an example, a color of decolorable printing as well as a color of non-decolorable printing is arbitrarily selectable. When a pull-down menu of a color setting portion 707a of decolorable printing in FIG. 7 is selected, as illustrated in FIG. 8, a selectable item is displayed in the pull-down menu. In addition, a menu of color which may be selected in the color setting portion 707a of decolorable printing becomes different depending on a combination of cartridges which are mounted on the image forming apparatus 2a. For example, it is also possible to select printing or the like, using "a single color of black", "decoloring (K)", "a single color of blue", or "decoloring (blue)".

The color selection button 707b which is next to the color setting portion 707a of decolorable printing is operate to select a color which is used in printing when "two colors" is selected in the color setting portion 707a. When a color is selected, a selected color is displayed in a square frame 707ba which is next to the color selection button 707b. In addition, when a menu other than the "two colors" is selected in the color setting portion 707a, the color selection button 707b becomes a gray-out state and not selectable. Since the color setting portion 707a of non-decolorable printing is the same as those which are described in FIGS. 5 and 6, descriptions thereof will be omitted.

In this manner, the control unit 105 may obtain setting information including color selection information (printing color) which designates a color to be printed among a plurality of colors which are different from each other, and are expressed using a color material which may be used in the image forming apparatus 2a.

Figure 9:
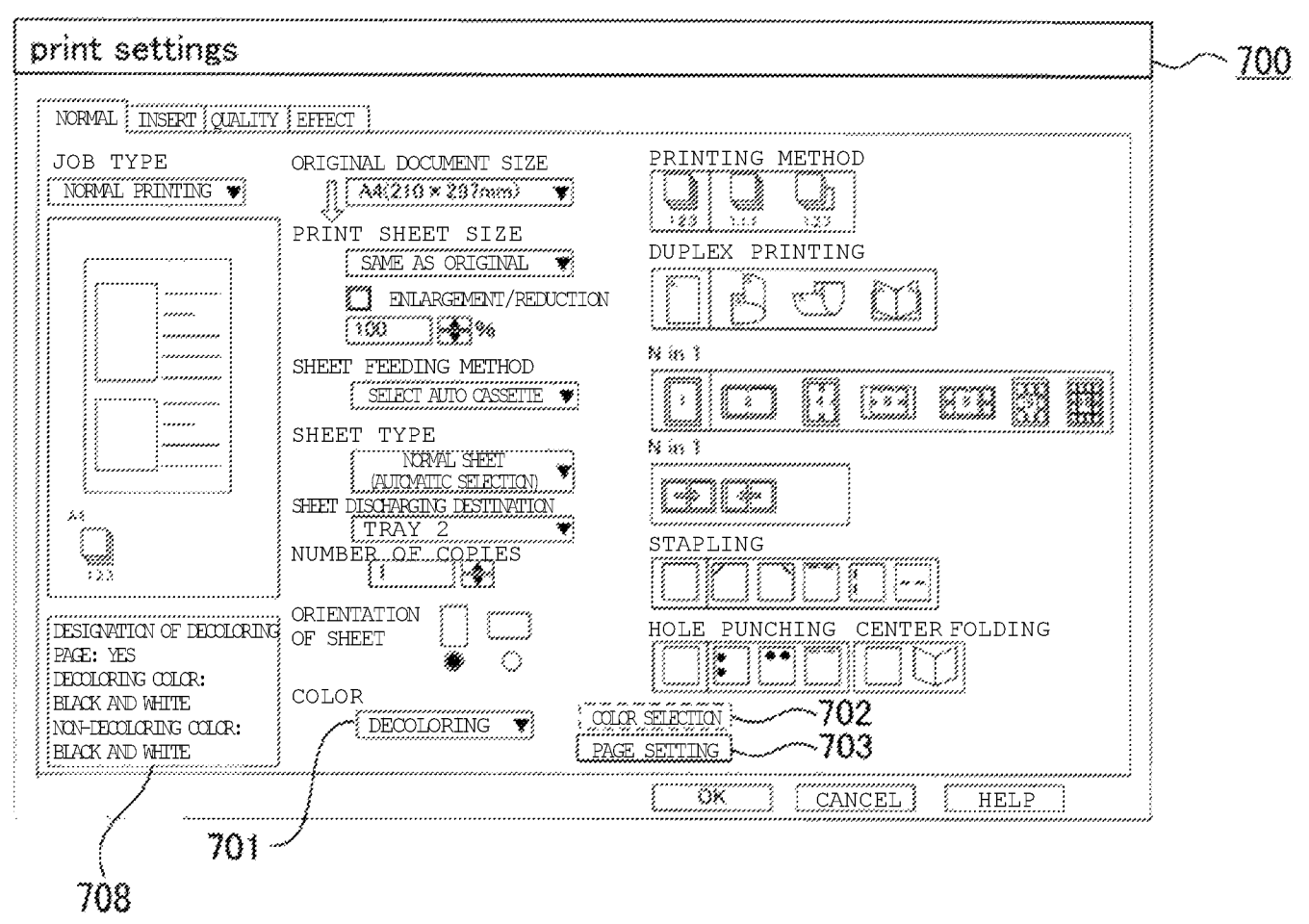

FIG. 9 illustrates a state in which page setting of decolorable printing is finished. A setting screen which is displayed using a printer driver includes a setting list display portion 708 indicating a list of setting conditions when page setting of decolorable printing is set. The setting list display portion 708 indicates that page setting of decolorable printing is set, and that pages for decolorable printing and pages for non-decolorable printing are mixed in one job.

The setting list display portion 708 of the setting screen of the printer driver which is illustrated in FIG. 9 indicates that the print setting is set such that pages for decolorable printing and pages for non-decolorable printing are mixed by displaying "designation of decolorable page: present", "decolorable color: black and white", and "non-decolorable color: black and white". In addition, information which is displayed in the setting list display portion 708 may include a message or an icon which indicates that the print setting is set such that pages for decolorable printing and pages for non-decolorable printing are mixed.

In addition, in the setting list display unit, not only the page setting of decolorable printing, but also setting other than that, duplex printing, print setting of N in 1, or the like, may be displayed. In addition, an operation screen of the printer driver 106b is displayed on the display unit 103 of the image processing device 1; however, there is no limitation to this configuration. For example, the operation screen of the printer driver 106b may be displayed on a display unit of an external terminal which is different from the image processing device 1 in which the printer driver 106b is executed.

Second Embodiment

Subsequently, a second embodiment will be described.

The second embodiment is a modification example of the first embodiment. Hereinafter, in the second embodiment, portions including the same function as those in the first embodiment will be depicted with the same reference numerals, and detailed descriptions thereof will be omitted. A hardware configuration which is adopted in the second embodiment is set to have the same configuration as that in the first embodiment.

In the first embodiment, designation of a page range which is a printing target using a decolorable material is described. In the second embodiment, the number of copies for decolorable printing and the number of copies for non-decolorable printing may be individually set, in one print job which is generated with respect to data of one document.

Figure 10:
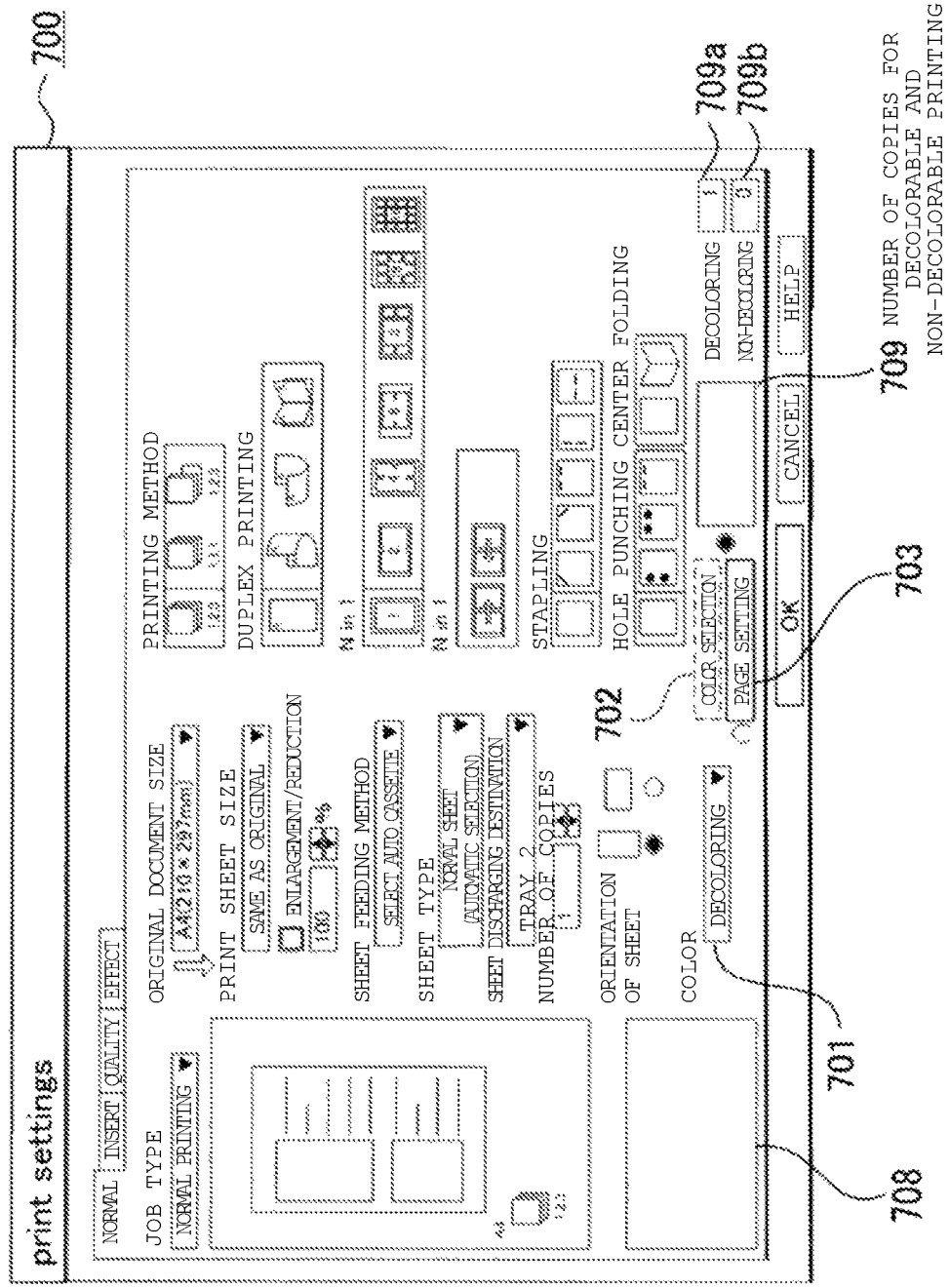
FIG. 10 illustrates an example of an operation screen caused to be displayed by a printer driver according to a second embodiment.

FIG. 10 illustrates a setting screen of the printer driver 106b according to the second embodiment. A setting screen 700 illustrated in FIG. 10 is different from a setting screen 700 in FIG. 9 in that a button 709 for setting "the number of copies for decolorable printing and non-decolorable printing" is included only in the former. The button for setting the number of copies for decolorable printing and non-decolorable printing 709 is a button for setting "the number of copies for decolorable printing" and "the number of copies for non-decolorable printing", respectively, with respect to the same document data. The button for setting the number of copies for decolorable printing and non-decolorable printing 709 may be selected when decolorable printing is selected in the color setting portion 701. In addition, any one of setting of "the number of copies for decolorable printing and non-decolorable printing" and setting of the "page designation" is alternatively selected. When "decoloring" is selected in setting of "color printing", and neither setting of "the number of copies for decolorable printing and non-decolorable printing" nor setting of the "page designation" is selected, a print job which is generated based on the print setting causes decolorable printing with respect to all of copies.

Numerals which are displayed in rectangular regions 709a and 709b next to the button for setting the number of copies for decolorable printing and non-decolorable printing 709 respectively denote "the number of copies for decolorable printing" (1 copy in example illustrated in FIG. 10), and "the number of copies for non-decolorable printing" (0 copies in example illustrated in FIG. 10), become a gray-out state when the button for setting the number of copies for decolorable printing and non-decolorable printing 709 is not selected, and become a display state in which the numerals may be selected when the button for setting the number of copies for decolorable printing and non-decolorable printing 709 is selected. Since detailed setting of the number of copies to be printed is not performed yet immediately after the button for setting the number of copies for decolorable printing and non-decolorable printing 709 is selected, the number of copies for decolorable printing is displayed as "1" corresponding to setting of the number of copies in the entire job (default "1" in FIG. 10 (designation region for number of copies under setting unit of sheet discharging destination)).

Figure 11:
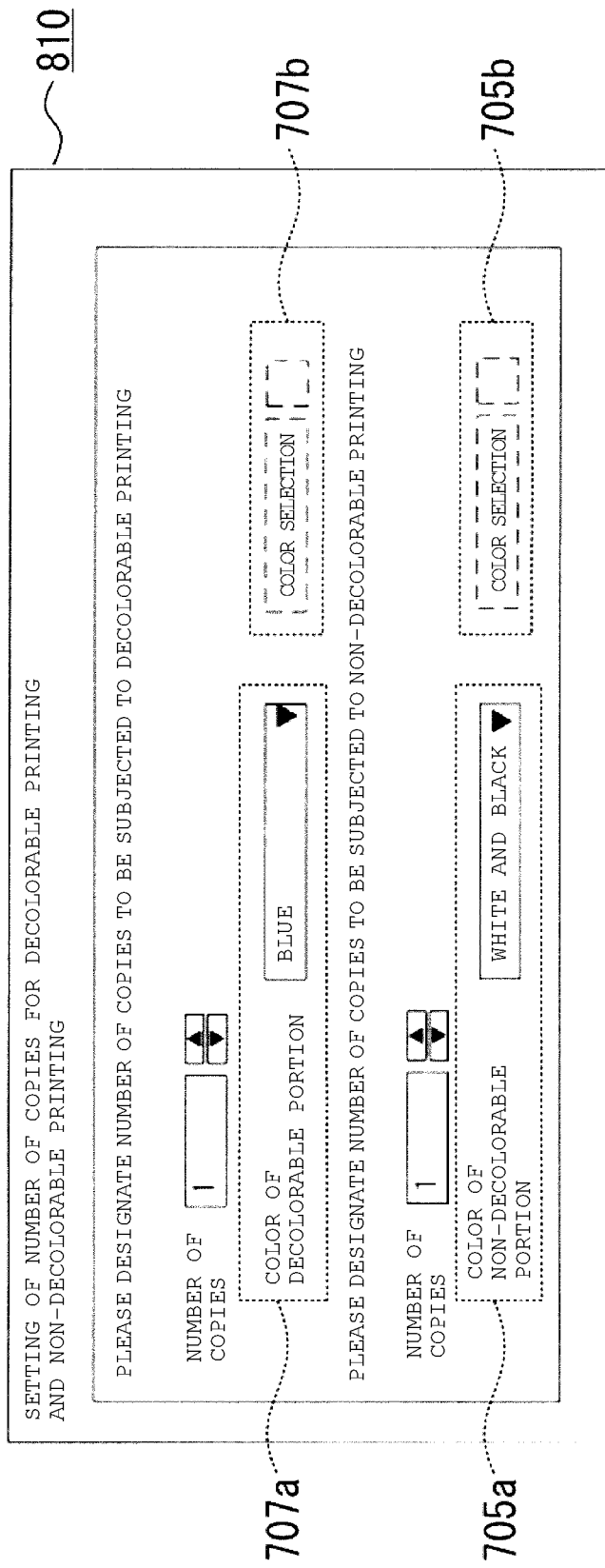
FIG. 11 illustrates an example of a setting screen for setting the numbers of copies for decolorable printing and non-decolorable printing.

In FIG. 10, when a radio button corresponding to the button for setting the number of copies for decolorable printing and non-decolorable printing 709 is checked (selected state illustrated in FIG. 10), and the button for setting the number of copies for decolorable printing and non-decolorable printing 709 is pressed, the control unit 105 causes the display unit 103 to display a setting screen for the number of copies 810 for setting the number of copies for decolorable printing and non-decolorable printing as illustrated in FIG. 11. In the setting screen for the number of copies 810 in FIG. 11, a user sets "the number of copies for decolorable printing" and "the number of copies for non-decolorable printing" based on a document which is a target of print setting. In addition, in the setting screen for the number of copies 810 which is exemplified in FIG. 11, similarly to that in the first embodiment, it is possible to set a color for decolorable printing, or a color for non-decolorable printing.

In the setting screen for the number of copies 810 which is illustrated in FIG. 11, when the pull-down menu of the color setting portion 707a of decolorable printing in FIG. 11 is selected, a selectable item is displayed in the pull-down menu. In addition, a menu of color which may be selected in the color setting portion 707a of decolorable printing is different depending on a combination of cartridges which are mounted on the image forming apparatus 2a. For example, it is also possible to select printing or the like, using "a single color of black", or "a single color of blue".

The color selection button 707b next to the color setting portion 707a of decolorable printing is operated to select a color used for printing when "two colors" is selected in the color setting portion 707a. When a color is selected, a selected color is displayed in the square frame 707ba next to the color selection button 707b. In addition, when a menu other than the "two colors" is selected in the color setting portion 707a, the color selection button 707b becomes a gray-out state, and is not selectable. Since the color setting portion 705a and the color selection button 705b of non-decolorable printing are the same as those which are described in FIGS. 5 and 6, descriptions thereof will be omitted.

As it is not necessary for a user to separately make instruction of a print job for decolorable printing and non-decolorable printing, the system according to the present embodiment is highly convenient.

Third Embodiment

Subsequently, a third embodiment will be described.

The third embodiment is a modification example of each of the above described embodiments. Hereinafter, in the third embodiment, portions including the same function as those which have been already described in each of the above described embodiments will be depicted with the same reference numerals, and detailed descriptions thereof will be omitted. A hardware configuration which is adopted in the third embodiment has the same configuration as that in the above described first embodiment.

Since an object of decolorable printing is to "reuse a printed sheet", when performing decolorable printing, it is not preferable to perform processes (predetermined process) that damages a sheet, or leaves a residual substance which is hard to be removed, such as stapling, center folding, gluing, and hole punching. According to the present embodiment, setting of finishing which is suitable for decolorable printing will be appropriately set depending on a situation.

Figure 12:
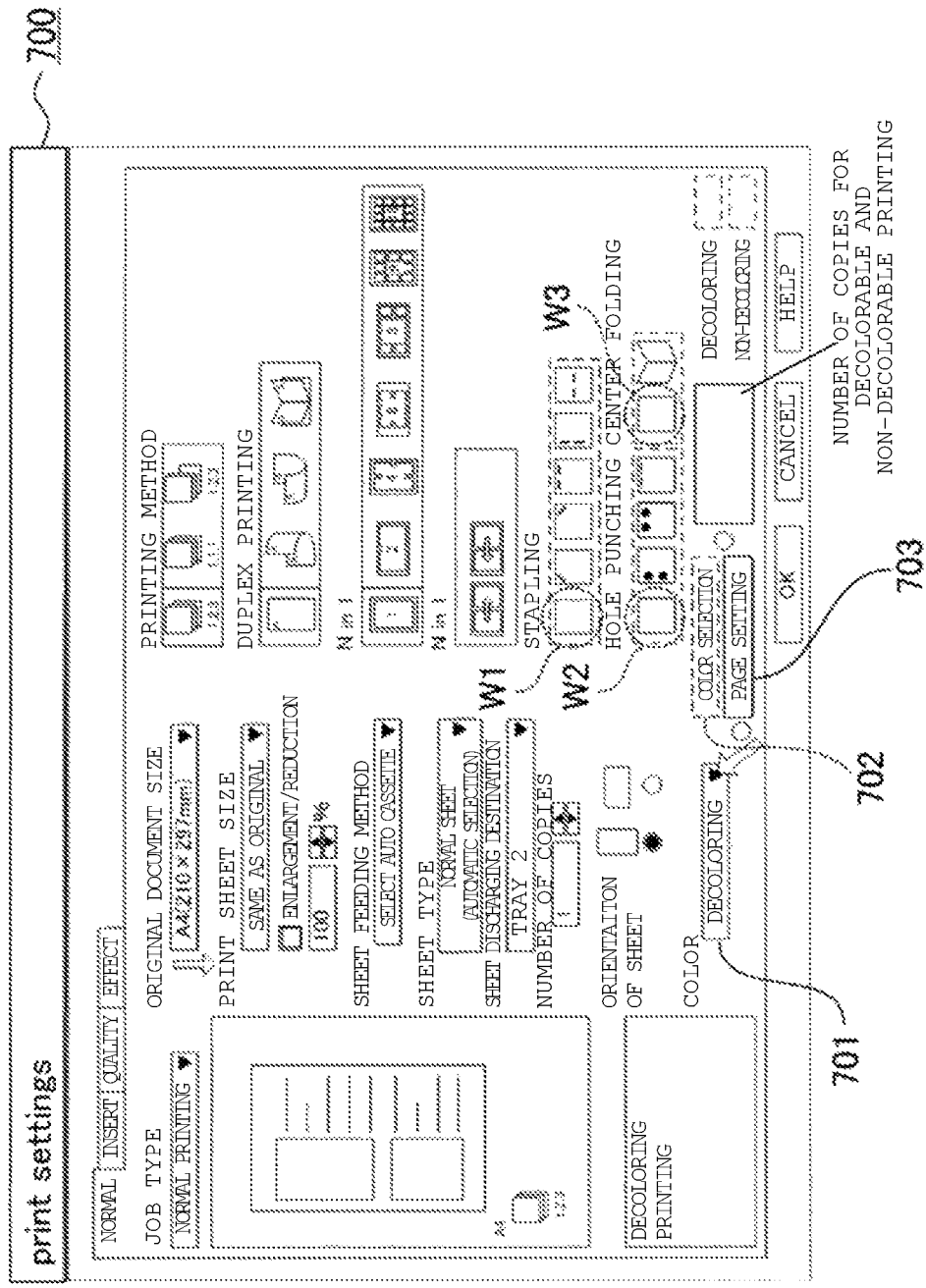
FIG. 12 illustrates an example of an operation screen caused to be displayed by a printer driver according to a third embodiment.

A setting screen illustrated in FIG. 12, displays a state in which "decoloring" is selected in the color setting portion 701. In this case, the control unit 105 sets setting portions of "stapling", "hole punching", and "center folding" among a variety of setting of finishing which is arranged in the vertical direction on the right side of the setting screen 700 in FIG. 12 to be in a gray-out state, so that the setting portions are not selectable. Alternatively, a setting icon W1 which denotes "no stapling", a setting icon W2 which denotes "no hole punching", and a setting icon W3 which denotes "no center folding" may be maintained to be selectable, and selection icons other than those may be set to be unselectable.

In addition, since setting of "duplex printing" or "N in 1" may be executed without adversely influencing on a reuse of a sheet when it is only a case of decolorable printing (for example, state in which decoloring is selected in "color setting portion"), the setting is selectable on the setting screen 700 in FIG. 12.

Also in the third embodiment, similarly to the first embodiment, the control unit 105 generates a print job in which pages for decolorable printing and pages for non-decolorable printing are mixed when a page range of decolorable printing is set. The print job which is generated in the image processing device 1 is transmitted to the image forming apparatus 2a, and the image forming apparatus 2a executes an image forming process based on print setting which is designated by the received print job.

According to the first embodiment, when setting of "duplex printing" or "N in 1" is performed, decolorable printing may be performed on the rear surface, and non-decolorable printing may be performed on the front surface of the same sheet, or both printing using decolorable material and non-decolorable material may be performed on any one face of the same sheet. In this case, a reuse rate of a sheet may decrease.

On the setting screen 700 of the printer driver 106b according to the third embodiment, when "page setting of decolorable printing" in which pages for decolorable printing and non-decolorable printing are mixed is further set, a setting region of duplex printing or N in 1 printing is changed to a gray-out display state, and unselectable by a user.

Figure 13:
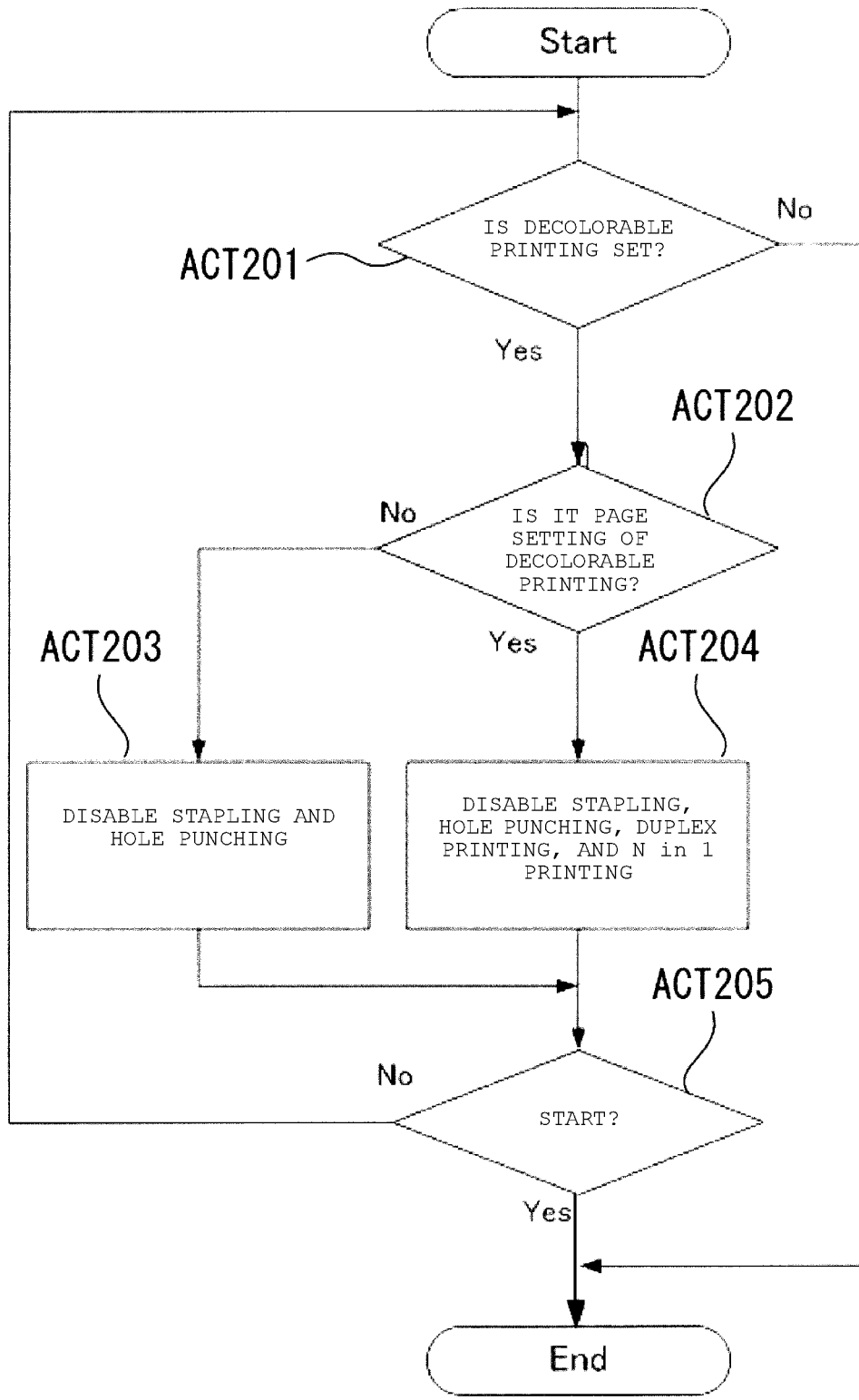
FIG. 13 is a flowchart of an example of a setting process performed by the printer driver according to the third embodiment.

FIG. 13 is an example of a flowchart of a process performed by the control unit 105, when setting of decolorable printing and setting of finishing are performed. When "decolorable printing" is selected in the color setting portion 701 in the setting screen 700 of the printer driver 106b (Yes in ACT 201), the control unit 105 changes, for example, setting icons, or the like, of "stapling" and "hole punching" to a gray-out display state, and a setting operation thereof is not allowed (ACT 203). Here, when page setting of decolorable printing (refer to FIG. 5) is set (Yes in ACT 202), setting icons or the like of "duplex printing" or "N in 1 printing" are switched to a gray-out display state in addition to "stapling" and "hole punching", and a setting operation thereof is not allowed (ACT 204). The control unit 105 transmits the generated print job of decolorable printing to the image forming apparatus 2a after receiving an instruction of executing printing (Yes in ACT 205).

Figure 14:
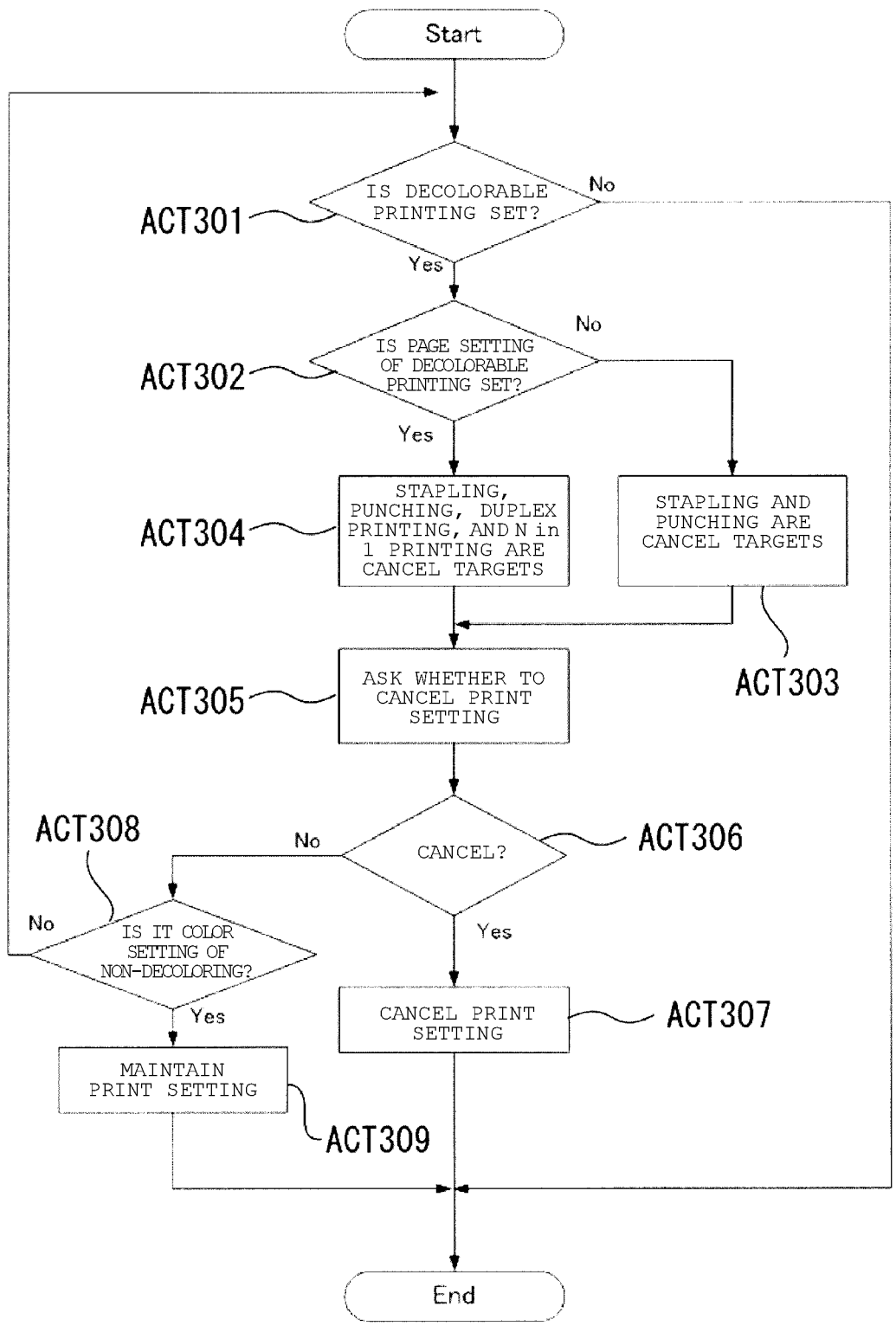
FIG. 14 is a flowchart of another example of the setting process performed by the printer driver according to the third embodiment.

Subsequently, a case in which setting of finishing such as stapling is selected before setting of decolorable printing will be described. FIG. 14 is a flowchart of a process carried out by the control unit 105 when setting of finishing such as stapling is selected before setting of decolorable printing.

When setting such as finishing is selected in advance, the control unit 105 (generation unit) determines whether or not "decolorable printing" is selected in the color setting portion 701 in the setting screen 700 of the printer driver (ACT 301). The control unit 105 (generation unit) generates a normal print job of non-decolorable printing, and transmits the print job to the image forming apparatus 2a when decolorable printing is not set (No in ACT 301). On the other hand, when decolorable printing is selected (Yes in ACT 301), and page setting for decolorable printing is not performed (No in ACT 302), the control unit 105 (generation unit) determines that processes of stapling and punching are cancel targets (ACT 303), and when such setting is performed, the control unit asks a user whether to cancel the setting of the finishing process as the cancel targets (ACT 305).

When decolorable printing is selected (Yes in ACT 301), and page setting for decolorable printing is performed (Yes in ACT 302), the control unit 105 (generation unit) also determines that duplex printing and N in 1 printing are the cancel targets, in addition to stapling and punching. Then when such setting is performed, the control unit 105 asks a user whether to cancel the setting of the finishing process as the cancel targets (ACT 305). When a user makes an instruction of cancelling the setting in response to the inquiry (Yes in ACT 306), the control unit 105 (generation unit) maintains setting of decolorable printing, and generates a print job in which setting of process of finishing for the cancel target is cancelled (ACT 307).

On the other hand, when a user does not make an instruction of cancelation (No in ACT 306), the control unit 105 (generation unit) makes setting of a non-decolorable color or the like possible (ACT 308), maintains setting of finishing (ACT 309), and generates a print job in which setting of decolorable printing is not possible.

In addition, in the above described embodiment, when setting of decolorable printing is selected after setting of stapling or the like, an inquiry is delivered to a user; however, the inquiry may not be delivered, and an instruction which is set later may be preferentially adopted, that is, setting of decolorable printing may be set to be valid, and setting of stapling, or the like, may be cancelled. In this manner, in the printer driver 106b according to the present embodiment, a print job including printing setting is generated, such that a specific finishing process and decolorable printing are not mixed in the same print job.

In this manner, when printing setting is performed so that any one page of a plurality of pages of a document as a printing target is printed using decolorable material, the control unit 105 (generation unit) according to the embodiment generates a print job (printing data) with respect to the document in a state in which setting of at least any one of duplex printing, N in 1 printing, a binding process, and a hole punching process is invalid with respect to a portion or all of the plurality of pages of the document.

Fourth Embodiment

Subsequently, a fourth embodiment will be described.

The fourth embodiment is a modification example of each of the above described embodiments. Hereinafter, in the fourth embodiment, portions including the same function as those which have been already described in each of the above described embodiments will be depicted with the same reference numerals, and detailed descriptions thereof will be omitted. A hardware configuration which is adopted in the fourth embodiment is the same configuration as that in the above described first embodiment.

In the third embodiment, when decolorable printing is set, setting of stapling is prohibited; however, according to the present embodiment, it is possible to perform setting of decolorable printing and finishing, according to designation by a user.

Figure 15:
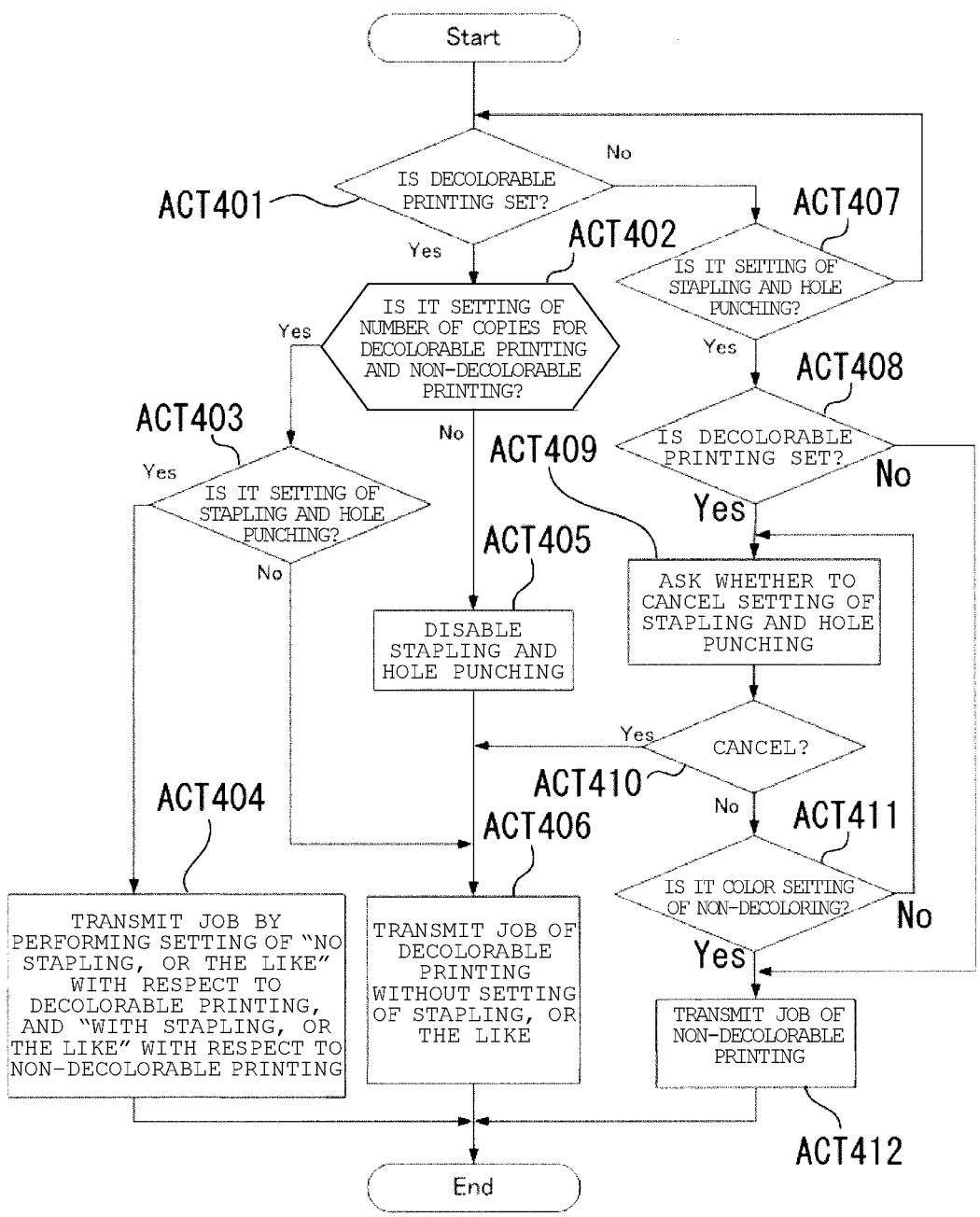
FIG. 15 is a flowchart of a setting process performed by a printer driver according to a fourth embodiment.

FIG. 15 is a flowchart of a print job generation process according to the fourth embodiment.

When the number of copies for decolorable printing and non-decolorable printing is set ((Yes in ACT 410), (Yes in ACT 402)), the control unit 105 (generation unit) performs print setting so that stapling or the like can be set (ACT 403). Then, the printing setting is made so that stapling or the like is not performed for a set number of copies with respect to decolorable printing, and a process of stapling or the like is performed for a set number of copies with respect to non-decolorable printing, and the job is transmitted (ACT 404).

In this case, in the image forming apparatus, it is preferable to set sheet discharging destinations so that a sheet discharging destination of non-decolorable printing in which a process of stapling or the like is performed, and a sheet discharging destination of decolorable printing in which stapling or the like is not performed are different from each other. In addition, even if the sheet discharging destination of non-decolorable printing in which the process of stapling or the like is performed and the sheet discharging destination of decolorable printing in which stapling or the like is not performed are set as the same sheet discharging destination, discharging positions on a tray may be set to be different from each other.

In addition, when setting of the number of copies for decolorable printing and non-decolorable printing is not performed ((No in ACT 401), (No in ACT 402)), the control unit 105 (generation unit) makes setting of stapling or the like impossible (ACT 405), generates a print job of decolorable printing in a state in which setting of stapling or the like is cancelled, and transmits the print job to the image forming apparatus (ACT 406).

Furthermore, when decolorable printing is not set (No in ACT 401), the control unit 105 (generation unit) enables setting of stapling or the like (ACT 407). Further, when decolorable printing is set (Yes in ACT 408), the control unit 105 asks a user whether to cancel setting of the stapling or the like (ACT 409). When the user desires cancelation of setting of the stapling or the like (Yes in ACT 410), the control unit 105 (generation unit) causes the process to proceed to ACT 406.

On the other hand, when the user does not desire cancelation of setting of the stapling or the like (No in ACT 410), the control unit 105 (generation unit) asks the user whether to perform setting of a color of non-decolorable printing (ACT 411). When setting of the color of non-decolorable printing is performed (Yes in ACT 411), the control unit generates a print job of non-decolorable printing, and transmits the print job to the image forming apparatus (ACT 412).

In addition, a process of prohibiting setting of the stapling or the like when setting of decoloring is performed before setting the stapling or the like is exemplified in the flowchart in FIG. 15; however, there is no limitation to this configuration. For example, when selecting of stapling or the like is set to be possible, and stapling or the like is selected after setting of decoloring, whether to give a priority to a selection of stapling or the like which is designated later may be asked. In addition, an instruction which is set later may be preferentially adopted without asking a user. In addition, according to the present embodiment, setting of N in 1 printing or duplex printing may be executed without any problem.

Figure 16:
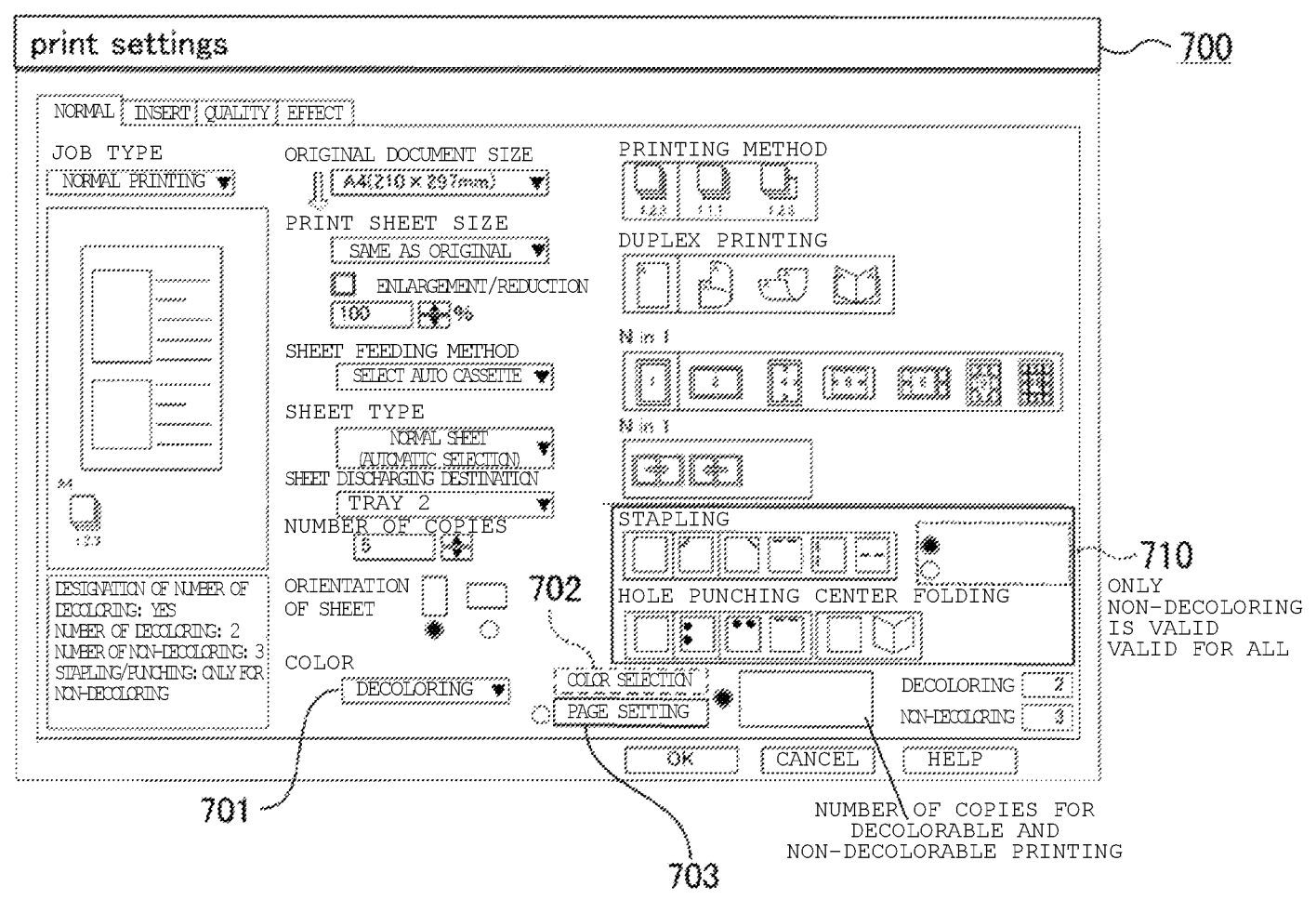

FIG. 16 is a modification example of the above described embodiment. According to the above described embodiment, when the number of copies for decolorable printing and the number of copies for non-decolorable printing using a button for setting the number of copies for decolorable printing and non-decolorable printing 709 are set, setting of stapling or the like is possible (ACT 403); however, in a printer driver setting screen illustrated in FIG. 16, a radio button 710, with which a user may alternatively select whether (1) to apply setting of stapling, hole punching, or center folding only to non-decolorable printing, or (2) to apply the setting of stapling, hole punching, or center folding to both decolorable printing and non-decolorable printing, is provided.

That is, when "only non-decoloring is valid" is selected, and "setting of the number of copies for decolorable printing and non-decolorable printing" is set, stapling or the like is applied as much as the number of copies for non-decolorable printing. In addition, when "valid for all" is set, stapling or the like is applied to all copies regardless of decolorable printing and non-decolorable printing.

In addition, when it is "valid for all", even when it is simply a case of a "decolorable" color, or a case in which setting of "page designation" is performed, stapling or the like may be applied. On the other hand, when "only non-decoloring is valid" is selected, it is preferable to apply stapling or the like, only when "setting of the number of copies for decolorable printing and non-decolorable printing" is set.

In addition, a transmission destination of a print job which is generated in the image processing device 1 is not necessarily the image forming apparatus, and may be a print server on a network.

In addition, in each of the above described embodiments, the image forming apparatus 2a is described as an apparatus which may perform color printing using a non-decolorable material; however, when the image forming apparatus only may perform monochrome printing, "color selection" may not be necessary.

In each of the above-described embodiments, the input section using a check box, a pull-down menu, a radio button, a text box, or the like, is merely an example, and a different interface may be employed, or another input section may be adopted. That is, when it is possible to achieve an object thereof, for performing an information input or an alternative item selection, a display format or the like of the interface may be arbitrarily selected.

Fifth Embodiment

In the third and fourth embodiments, a predetermined process (stapling, hole punching, center folding, or the like) with respect to the printer driver 106b which generates a print job is set when decolorable printing is performed. Meanwhile, if a printer driver does not have functions described in the third and fourth embodiments, a print job which includes an instruction of decolorable printing and an instruction of the predetermined process which is not appropriate thereto would be generated. In addition, in a printing system in which a print job is transmitted to a print server from the printer driver through a network and an image forming apparatus obtains the print job on the print server, he image forming apparatus may not include a configuration to perform the printing according to the setting instructed in the print job.

Hereinafter, an image forming apparatus which obtains a print job and performs appropriate decolorable printing according to a situation will be described.

Figure 17:
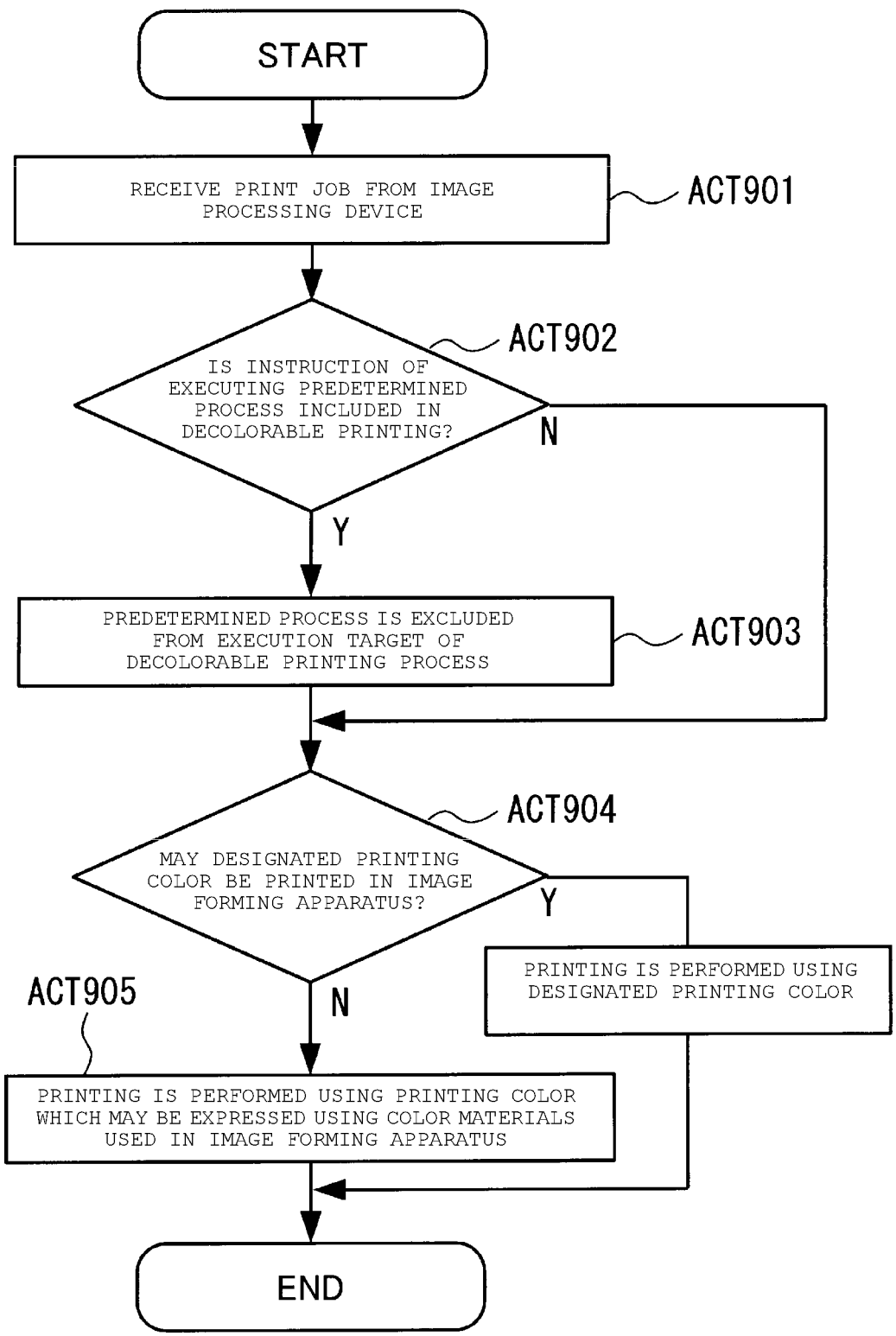
FIG. 17 is a flowchart of a process performed by an image forming apparatus according to a fifth embodiment.

FIG. 17 is a flowchart of a process performed by the image forming apparatus 2a according to the present embodiment.

The control unit 205 (reception unit) in the image forming apparatus 2a receives a print job from the image processing device 1 through a communication interface 201 (ACT 901).

When the received print job includes an instruction of executing a predetermined process (stapling, hole punching, center folding, or the like) which prevents a reuse of a sheet and requests decolorable printing using the printer unit 2042a (Yes in ACT 902), the control unit 205 sets a process of decolorable printing based on other instructions except for the predetermined process to an execution target in the printer unit 2042a (ACT 903).

In addition, the control unit 205 determines whether a printing color which is designated by the received print job may be printed using a color material which may be used in the image forming apparatus 2a. When the color is determined to be a color which is not capable of being printed using the color material which may be used in the image forming apparatus 2a (No in ACT 904), printing is performed using the printing color which may be expressed using the color material which may be used in the image forming apparatus (ACT 905).

In the above embodiments, the printer driver program is recorded in advance in a storage region provided of the apparatus; however, there is no limitation to this configuration. The same program may be downloaded to the apparatus from a network, or a computer-readable recording medium in which the same program is recorded may be installed in the apparatus. As the recording medium, when it is a recording medium which may store program, and is a computer-readable recording medium, it may have any form. Specifically, as the recording medium, there is, for example, an internal storage device which is installed in a computer such as a ROM or a RAM, CD-ROM or a flexible disk, a DVD disc, a magneto-optical disc, a portable recording medium such as an IC card, a database which holds a computer program, or another computer and a database thereof, a transmission medium on a line, or the like. In addition, functions which are obtained through installing in advance or downloading may be implemented jointly with an operating system (OS) in the apparatus.

In addition, a portion or all of the programs may be an execution module which is dynamically generated.

In addition, in each of the above-described embodiments, at least a portion of various processes which are implemented by executing the program in one or a plurality of CPUs or MPUs may also be executed using an ASIC.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of causing a printer to carry out a printing operation, comprising:
   displaying, on a display, a user interface including a first input region in which a first number of copies of a document to be printed with a decolorable material is specified and a second input region in which a second number of copies of the same document to be printed with a non-decolorable material is specified, and a third input region in which a type of a material to be used for printing the document is specified;
   detecting, on a computer, a user input designating the first number and the second number; and
   generating a print command that causes the printer to print the first number of copies with the decolorable material and the second number of copies with the non-decolorable material, wherein
   when the decolorable material is specified in the third input region, the first and second input regions are enabled for input.

2. The method according to claim 1, wherein
   the user interface further includes a fourth input region in which a first selection as to whether or not sheet processing is to be performed on the copies of the document, is made, the sheet processing including at least one of punching, stapling, and folding, and in which a second selection as to whether or not the sheet processing is to be performed on the copies of the document to be printed with the decolorable material, is made.

3. The method according to claim 1, wherein
   when the decolorable material is specified in the third input region, the sheet processing including at least one of punching, stapling, and folding is disabled.

4. The method according to claim 1, wherein
   the user interface further includes a fourth input region in which a selection to enable setting of the first and the second number is made, and
   the first and second input regions are enabled for input upon the selection in the fourth input region when the decolorable material is specified in the third input region.

5. The method according to claim 1, wherein
   the user interface further includes a fourth input region in which setting of duplex printing or multiple-page printing is made, and
   when the decolorable material is specified in the third input region, at least one of the duplex printing and the multiple-page printing remains enabled.

6. The method according to claim 1, wherein the steps further includes:
   detecting a user input designating a first color of the decolorable material and a user input designating a second color of the non-decolorable material, and wherein
   the print command causes the printer to print the first number of copies with the decolorable material of the first color and the second number of copies with the non-decolorable material of the second color.

7. The method according to claim 6, wherein the steps further includes:
   displaying, on the display, a second user interface including a fourth input region in which the first color is specified and a fifth input region in which the second color is specified.

8. The method according to claim 7, wherein
   the second interface further includes a sixth input region in which the first number is specified and a seventh input region in which the second number is specified, and
   the sixth and seventh input regions initially display the first and second numbers specified in the first and second input regions.

9. A method of causing a printing system to carry out a printing operation, comprising:
   displaying, on a display, a user interface including a first input region in which a type of a material to be used for printing a document is specified and a second input region in which a selection as to whether or not sheet processing is to be performed on printed sheets of the document, is made, the sheet processing including at least one of punching, stapling, and folding; and
   generating a print command that causes the printing system to print the document with the material specified in the first input region and perform the sheet processing specified in the second input region, if any, on the printed document, wherein
   when a decolorable material is specified in the first input region, the sheet processing is not performed.

10. The method according to claim 9, wherein
    when the decolorable material is specified in the first input region, the second input region is disabled so that the selection cannot be made.

11. The method according to claim 9, wherein the steps further include:
    when the decolorable material is specified in the first input region, displaying, on the display, a second user interface including a third input region in which one or more page numbers of the document to be printed with the decolorable material and one or more page numbers of the document to be printed with a non-decolorable material are specified.

12. The method according to claim 11, wherein
    the second user interface further includes a fifth input region in which a color of the decolorable material is specified and a sixth input region in which a color of a non-decolorable material is specified.

13. The method according to claim 11, wherein
    when an input that at least one page of the document is to be printed with the decolorable material and at least one page of the document is to be printed with the non-decolorable material is made in the third input region, at least one of duplex printing or multiple-page printing on one sheet is disabled.

14. The method according to claim 11, wherein the steps further include:
when an input that at least one page of the document is to be printed with the decolorable material and at least one page of the document is to be printed with the non-decolorable material is made in the third input region, generating a message prompting a user to input whether or not duplex printing or multiple-page printing on one sheet specified by the user is to be cancelled.

15. The method according to claim 9, wherein
when the selection to perform the sheet processing is made in the second input region before an input is made in the first input region, a non-decolorable material is specified in the first input region.

16. The method according to claim 15 wherein
when the selection to perform the sheet processing is made in the second input region, the first input region is disabled so that inputs cannot be made in the first input region.

17. The method according to claim 9, wherein
when the selection to perform the sheet processing is made in the second input region, a selection of the decolorable material is disabled in the first input region.

18. A method of causing a printing system to carry out a printing operation, comprising:
displaying, on a display, a user interface including a first input region in which a type of a material to be used for printing a document is specified and a second input region in which a selection as to whether or not sheet processing is to be performed on printed sheets of the document, is made, the sheet processing including at least one of punching, stapling, and folding; and
generating a print command that causes the printing system to print the document with the material specified in the first input region and perform the sheet processing specified in the second input region, if any, on the printed document, wherein
when the selection to perform the sheet processing is made in the second input region before an input is made in the first input region, a non-decolorable material is specified in the first input region.

19. The method according to claim 18, wherein
when the selection to perform the sheet processing is made in the second input region, the first input region is disabled so that inputs cannot be made in the first input region.

20. The method according to claim 18, wherein
when the selection to perform the sheet processing is made in the second input region, a selection of the decolorable material is disabled in the first input region.

* * * * *